(12) United States Patent
Costa et al.

(10) Patent No.: US 8,370,894 B2
(45) Date of Patent: Feb. 5, 2013

(54) METHOD AND SYSTEM FOR ENFORCING SECURITY POLICES IN MANETS

(75) Inventors: Luciana Costa, Turin (IT); Giorgio Freguglia, Turin (IT); Federico Frosali, Turin (IT)

(73) Assignee: Telecom Italia S.p.A., Milan (IT)

( * ) Notice: Subject to any disclaimer, the term of this patent is extended or adjusted under 35 U.S.C. 154(b) by 364 days.

(21) Appl. No.: 12/448,637

(22) PCT Filed: Dec. 29, 2006

(86) PCT No.: PCT/EP2006/012606
§ 371 (c)(1),
(2), (4) Date: Oct. 21, 2009

(87) PCT Pub. No.: WO2008/080430
PCT Pub. Date: Jul. 10, 2008

(65) Prior Publication Data
US 2010/0058442 A1   Mar. 4, 2010

(51) Int. Cl.
*H04L 29/06* (2006.01)
*G06F 17/00* (2006.01)
*G06F 15/16* (2006.01)

(52) U.S. Cl. .................................. 726/1; 726/4; 726/14
(58) Field of Classification Search ........................ None
See application file for complete search history.

(56) References Cited

U.S. PATENT DOCUMENTS

| | | | | |
|---|---|---|---|---|
| 5,151,900 A * | 9/1992 | Snyder et al. | ................. | 370/400 |
| 6,751,248 B1 * | 6/2004 | Tan | .............................. | 375/132 |
| 2003/0154399 A1 * | 8/2003 | Zuk et al. | ...................... | 713/201 |
| 2003/0236870 A1 * | 12/2003 | Boivie et al. | .................. | 709/223 |
| 2005/0030921 A1 * | 2/2005 | Yau | ................................ | 370/329 |
| 2005/0141706 A1 * | 6/2005 | Regli et al. | ....................... | 380/44 |
| 2005/0246767 A1 * | 11/2005 | Fazal et al. | ...................... | 726/11 |
| 2008/0261580 A1 * | 10/2008 | Wallentin et al. | ............. | 455/418 |

OTHER PUBLICATIONS

Strand, "Adaptive Distributed Firewall Using Intrusion Detection", Department of Informatics, University of Oslo, pp. i-vi and 1-149, (2004).
Ramanujan et al., "Intrusion-Resistant Ad Hoc Wireless Networks", IEEE Military Communications Conference, N.Y. IEEE, U.S., vol. 1 of 2, pp. 890-894, (2002).
Rajavaram et al., "Neighborhood Watch: An Intrusion Detection and Response Protocol for Mobile Ad-Hoc Networks"; Department of Computer Science and Electrical Engineering, University of Maryland Baltimore County, pp. 1-9, (2002).
Grant et al., Distributed Firewall Technology, Signal 9 Solutions Inc., pp. 1-9, (2000).
Djordjevic et al., "Architecture for Secure Work of Dynamic Distributed Groups", Consumer Communications and Networking Conference, IEEE Las Vegas, NV, pp. 495-500, (2004).
Djordjevic et al., "An Architecture for Dynamic Security Perimeters of Virtual Collaborative Networks", Network Operations and Management Symposium, IEEE/IFIP, Seoul, Korea, pp. 249-262, (2004).

(Continued)

*Primary Examiner* — Christopher Revak
(74) *Attorney, Agent, or Firm* — Finnegan, Henderson, Farabow, Garrett & Dunner, LLP

(57) ABSTRACT

A method of enforcing security policies in a mobile ad-hoc network, includes: entrusting at least one first network node along a data traffic route from a data traffic origin node to a data traffic destination node, with the enforcing of predefined security policies on the data traffic; and entrusting at least one second network node, distinct from said first network node, with the control of the enforcement of the security policies by the first network node.

22 Claims, 17 Drawing Sheets

OTHER PUBLICATIONS

Argyroudis, et al., "Secure Routing for Mobile Ad Hoc Networks", Department of Computer Science, University of Dublin, Trinity College, http://www.ctvr.ie/docs/EN_Pubs/secure-adhoc-routing.pdf, 42 pages, (2006).

Clausen et al., "Optimized Link State Routing Protocol", Network Working Group, Request for Comments: 3626, The Internet Society, pp. 1-75, (2003).

* cited by examiner

| 0 - 15 | 16 - 31 |
|---|---|
| Advertised Neighbor Main Address ||
| Advertised Neighbor Main Address ||
| ............... ||

| |
|---|
| 510  IP_S |
| 530  MAC_S |
| 515  IP_D |
| 520  MAC_in |
| 525  ID |

| R_dest_addr | R_next_addr | HOP COUNT | R_iface_addr |
|---|---|---|---|
| R_dest_addr | R_next_addr | HOP COUNT | R_iface_addr |
| " | " | | " |
| " | " | | " |

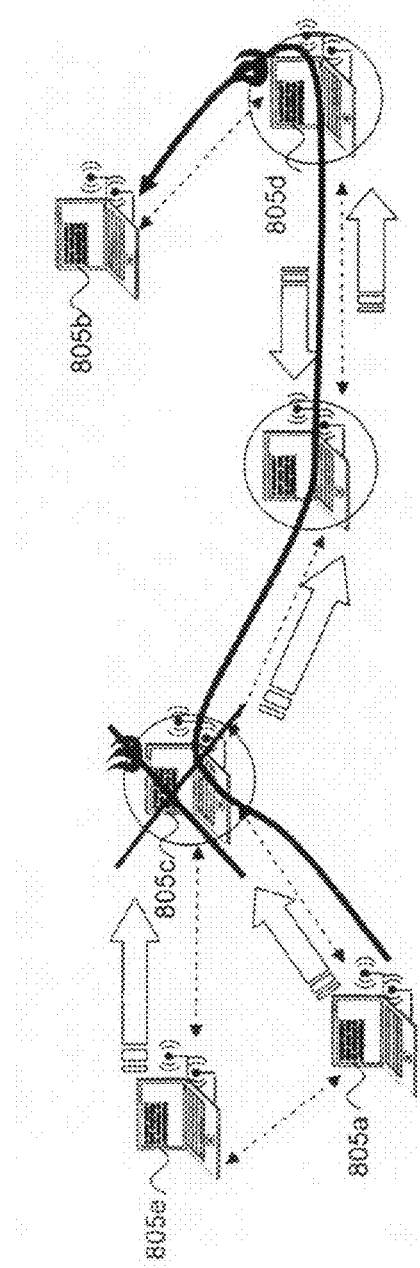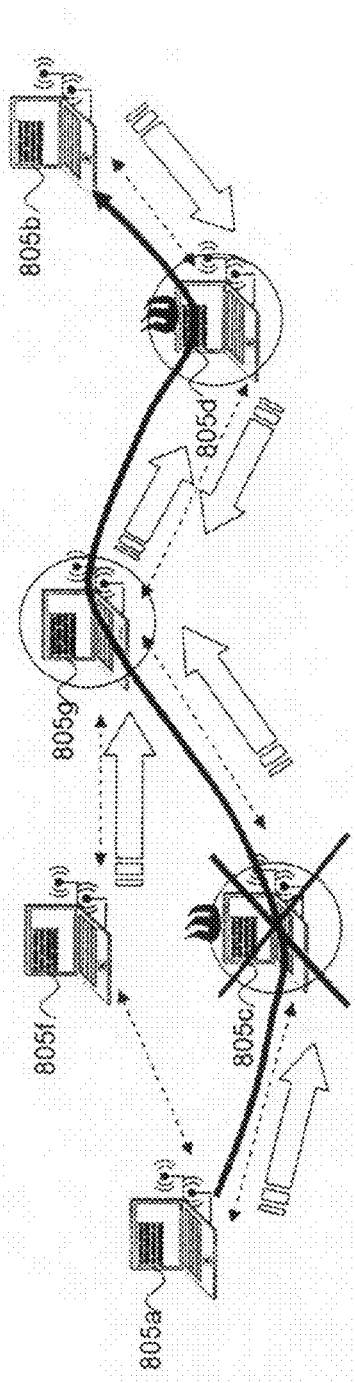

FIG. 11

Notification — 1100
- IP_S — 1105
- IP_D — 1110
- IP_DFA — 1115
- ID — 1120
- RuleID — 1125
- IP Notification — 1130

FIG. 12

Quarantine — 1200
- IP_S — 1205
- IP_D — 1210
- IP_DFA — 1215
- ID — 1220
- RuleID — 1225
- Client Global Repair (CGR) — 1230
- Source Global Repair (SGR) — 1235

FIG. 13

Alert — 1300
- IP_S — 1305
- IP_D — 1310
- IP_DFA — 1315
- ID — 1320
- RuleID — 1325
- IP Alert — 1330

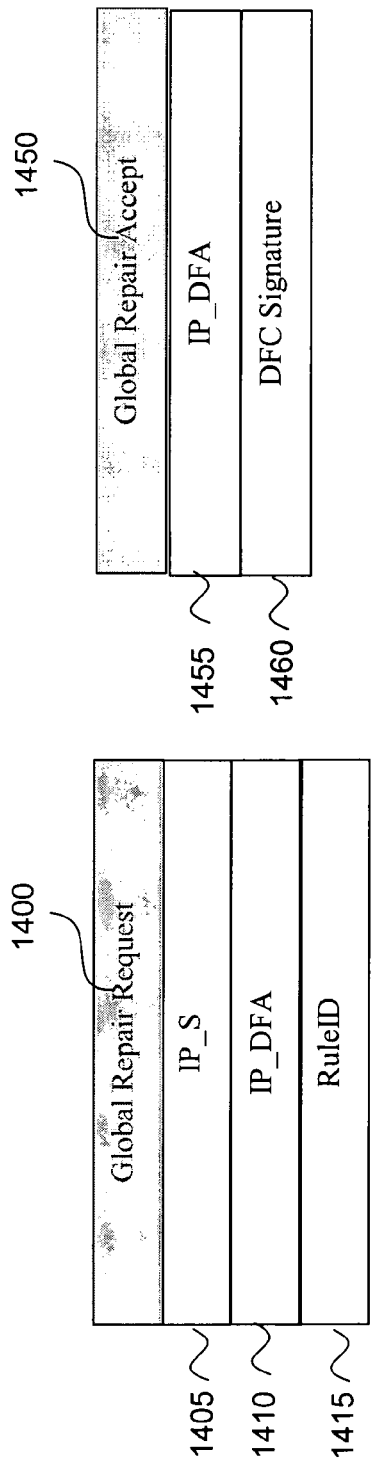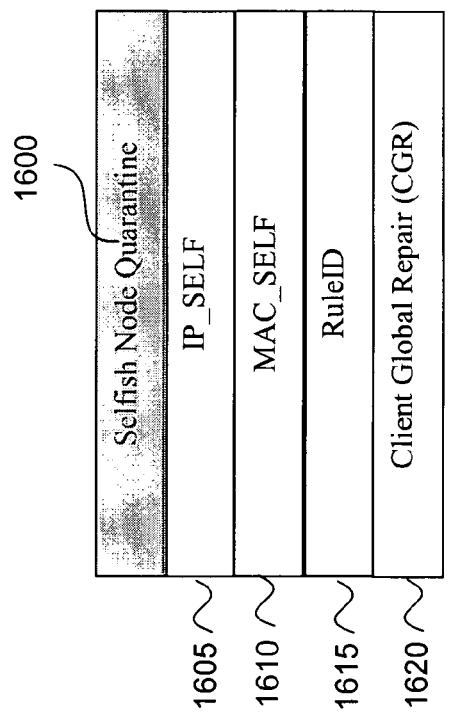

METHOD AND SYSTEM FOR ENFORCING SECURITY POLICES IN MANETS

CROSS REFERENCE TO RELATED APPLICATION

This application is a national phase application based on PCT/EP2006/012606, filed Dec. 29, 2006.

BACKGROUND OF THE INVENTION

1. Field of the Invention

The present invention generally relates to the field of telecommunications, and particularly to Mobile Ad-hoc NETworks (MANETs). Even more particularly, the invention relates to the implementation and enforcing of security policies in MANETs. Specifically, the invention concerns a method and a system adapted to detect and react to situations wherein the enforcement of security policies set forth for a MANET is missing or improper.

2. Description of the Related Art

The heterogeneous nature and the mobility characteristics of a MANET makes it particularly difficult to control the behavior of the nodes that make up the network.

Nowadays, the acceptance of one or more network security rules by a generic MANET node as a condition for allowing the node accessing and becoming part of the network does not prevent that node from violating said rules later, and thus escaping from the control upon it. A node that, after an authentication procedure, has been granted access to an ad-hoc network is potentially able to perform any action, such as stop properly routing traffic received from and directed to other MANET nodes, allowing access to services to which some node is not authorized, allowing access to other nodes by revealing the necessary security information, like the ciphering keys.

For these reasons, distributed security mechanisms need to be defined for MANETs, aiming at making it more difficult to corrupt the network nodes.

The problem of the enforcement of security policies in ad-hoc networks has already been addressed.

For example, in the thesis work "Adaptive distributed firewall using intrusion detection" of L. Strand of the Oslo University, reference is made to a distributed firewalling architecture in which a master (a management station) distributes the security policies to clients, which are the nodes making up the network; the clients apply the security policies and notify the master of the results of the security policies application.

The described architecture is not expressly conceived for MANETs, but the latter is one of the environments considered as a possible application. The interaction with a distributed intrusion detection system is also considered, which, in case of necessity, allows to command a reconfiguration of the firewall of a certain node.

In J. Grant et al. "Distributed firewall technology", Signal 9 Solutions Inc., 2000, a distributed firewalling architecture is considered wherein a Distributed Firewall Server (DFS) distributes the security policies, valid for a certain network, to all the clients belonging thereto (possibly in a personalized way). Each client, in normal operation, creates locally log files of its operation (also related to possible malfunctioning of the firewall) and of the traffic passing through that node; the logged data are then sent to the DFS, that correlates them for detecting possible inconsistencies with respect to the security policies deployed. The DFS, if possible, may also attempt to sniff the traffic, to check the proper implementation of the security policies deployed.

A different approach is described in S. Rajavaram et al., "Neighboring watch: an intrusion detection and response protocol for mobile ad-hoc networks", University of Maryland, October 2002, where an architecture for detecting intrusions and anomalous behavior of the nodes belonging to a MANET is discussed. The possibility is exploited that a client (controller) being in the neighbourhood of other nodes "listens", over the wireless link, to the communications of said neighbouring nodes, so as to determine the presence of undesired or non-compliant traffic. The detection is made individually by every client, and the (possible) countermeasures may be applied locally, in a passive way, by exclusion of the malicious node from the announcements performed by the controller with the routing protocol, or in active way, notifying the violation to a master-cluster station that sets-up an election system involving all the MANET nodes for deciding together whether or not to exclude a certain client.

SUMMARY OF THE INVENTION

The Applicant has observed that the adoption of a distributed security mechanism is not, per-se, sufficient to ensure that each network node behaves properly. Moreover, from the viewpoint of a network operator/administrator, the adoption of a totally distributed security mechanism may be unacceptable, because incompatible with the network control capability that an administrator may want to have.

In the work of L. Strand, there is no real and reliable way of controlling the application of the security policies. From one hand, it is stated that it is the network node applying the policies that has to notify to the management station whether the policy application was successful: regretfully, if that node is corrupted, or pursues different plans, it may send to the management station false information. From the other hand, even if a distributed intrusion detection mechanism is envisaged, which might affect the firewall reconfiguration on the nodes, nothing is said about how this could be done; moreover, it seems that the proposed way is to employ the intrusion detection system to reveal classic intrusions, instead of controlling the proper application of the firewalling rules.

In the work of J. Grant et al., which is not expressly conceived for MANETs, no efficient method of control of the security policies applied by the different clients is provided. The proposed solution relies in part on the communications between the clients and the DFS, but the reported data might be totally false. Also in respect of the envisaged possibility that the DFS directly sniffs the traffic for controlling the proper application of the policies, it is not explained how this could be done; moreover, within a MANET it is practically impossible that a single station, even if located within the MANET, can intercept all the network traffic, because in a wireless network any station may at most listen to the traffic passing within its radio range.

In the work of S. Rajavaram et al., the detection of anomalous behaviors is not focused on the control of the implementation of firewalling policies, rather on the generic control of a node. No mechanism is described for the selection of the nodes to be controlled by a controller node: this means that a node controls all the clients within its radio range, without limitations, but this might cause a great waste of the controller node's resources. Additionally, the proposed architecture does not envisage the presence of a real management node that tracks the overall behavior of the network.

The Applicant believes that there is the need of providing, for MANETs managed by a network operator/administrator, security mechanisms capable of exercising a control on the behavior of the network nodes, and also capable of allowing to check the proper application of the security policies intended to be implemented.

The Applicant has found that this need can be satisfied by means of a security mechanism which is based, from one side, on the centralization of the control mechanisms, through which the network is coordinated and managed, and, from another side, on the distribution of the security functions across the different network nodes.

In particular, the security mechanism according to an embodiment of the present invention allows to control the proper application, by every network node, of the security policies set forth by a network administrator, and to identify possible violations. This is achieved by entrusting the nodes of the network with the task of controlling the enforcement of the security policies, in order to detect cases of violations/improper enforcement of the security policies by other network nodes, and to identify the network nodes that are responsible of the security policies misapplication.

By distributing the control function to several, potentially all the network nodes, the data processing burden on the generic node is reduced, and the performance is thus improved, avoiding at the same time the formation of malicious "agreements" between network nodes, which could make the control vain; the overall network security is thus increased.

Essentially, the present invention proposes a mechanism for identifying the network nodes that are eligible for being controlled: advantageously, these nodes are a subset of the nodes of the network, and particularly they are the nodes that, due to the network topology, have the task of routing traffic from/to other network nodes.

In turn, the nodes that will have to perform the task of controllers are identified by an interaction with the routing protocol, designed to reduce, as far as possible, the number of nodes to be controlled by each controller node. Indeed, to verify the proper application of the security policies defined for the MANET, particularly to detect unauthorized traffic, each node should monitor all the traffic involving the nodes that are within its radio range, but this would imply a substantial waste of resources (particularly energy, which in mobile, wireless nodes is always precious). According to an embodiment of the present invention, the number of controls to be carried out is significantly limited, by properly choosing the nodes to be controlled, to the extent that, at best, a node may continuously control just a single other node. Advantageously, a generic node may in general be controlled by more than one controller nodes (depending on the network topology).

The controller nodes are able to identify which node(s) has not properly enforced the security policies, as well as which node(s) violated the security policies, exploiting the missing enforcement of the security policies by network nodes that are entrusted with the enforcement thereof on the violator node.

The invention also provides for countermeasures to be taken once one or more nodes have been identified that violated or did not enforce the security policies.

Further, according to an embodiment of the present invention, selfish network nodes may be identified (and contrasting actions can accordingly be taken), i.e. nodes that tend to participate to the MANET in a utilitarian way, propagating only their own data packets, and not forwarding (discarding) data packets originated by, and addressed to other nodes.

According to an aspect of the present invention, a method of enforcing security policies in a mobile ad-hoc network is provided, comprising:

entrusting at least one first network node, along a data traffic route from a data traffic origin node to a data traffic destination node, with the enforcing of predefined security policies on said data traffic:

entrusting at least one second network node, distinct from said first network node, with the control of the enforcement of the security policies by said first network node.

According to another aspect of the present invention, a system for enforcing security policies in a mobile ad-hoc network, comprising:

at least one first network node, along a data traffic route from a data traffic origin node to a data traffic destination node, entrusted with the enforcing of predefined security policies on said data traffic:

at least one second network node, distinct from said first network node, entrusted with the control of the enforcement of the security policies by said first network node.

BRIEF DESCRIPTION OF THE DRAWINGS

The features and advantages of the present invention will result apparent by reading the following detailed description of an embodiment thereof, provided merely by way of non-limitative example, and referring to the annexed drawings, wherein:

FIG. 5A shows a format of Topology Control (TC) messages used by the routing protocol;

FIG. 5B schematically shows the information that a DFC client of the DFC architecture maintains in order to detect the nodes whose behavior is not compliant to MANET security policies;

FIG. 5C schematically shows the information included in a routing table kept by a DFC client;

FIGS. 8A to 8F schematically show examples of the identification of nodes that have not enforced the security policies;

FIG. 11 schematically shows a content of a notification alarm message used in an embodiment of the present invention;

FIG. 12 schematically shows a content of a quarantine alarm message used in an embodiment of the present invention;

FIG. 13 schematically shows a content of an alert alarm message used in an embodiment of the present invention;

FIGS. 14A and 14B show a content of global repair request and accept alarm messages used in an embodiment of the present invention;

FIG. 16 shows a content of a selfish node quarantine message used in an embodiment of the present invention;

DETAILED DESCRIPTION OF THE PREFERRED EMBODIMENT OF THE INVENTION

Figure 1:
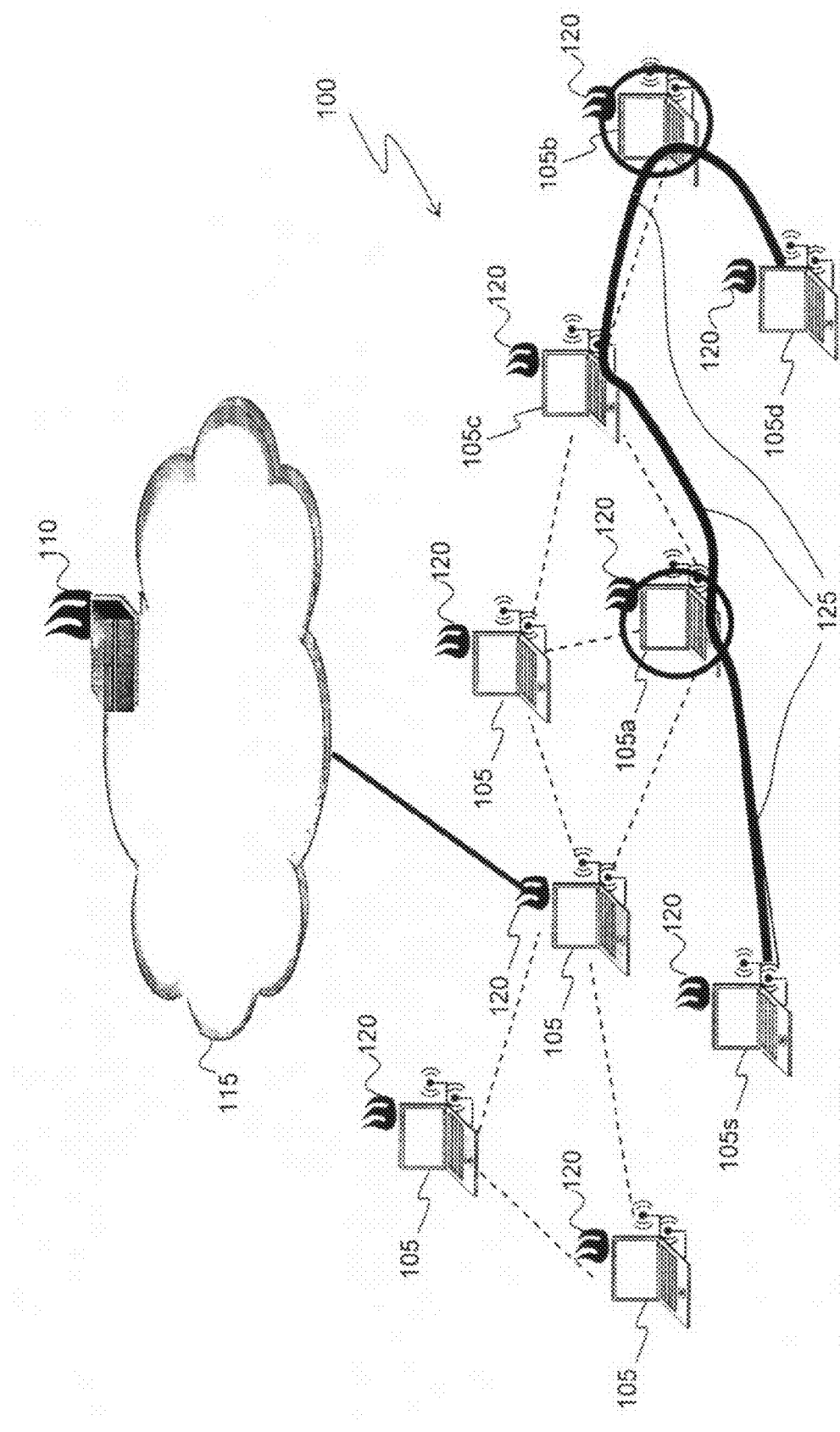
FIG. 1 pictorially shows a scenario of a MANET where the present invention can be applied.

In FIG. 1, a scenario in which the present invention is advantageously applied is schematically shown. In the drawing, reference numeral 100 denotes a MANET comprising a plurality of mobile network nodes 105, in wireless communications relationship, where the generic network node 105 communicates with other network nodes through neighbouring network nodes 105 that, at a certain moment, fall within its radio range. In the drawing, two nodes that are in direct connection with one another are depicted as connected by a dashed line. Since in general two network nodes cannot in direct connection, because they cannot fall within their respective radio ranges, each node 105 of the MANET acts not only as a traffic originator and/or a traffic destination, but also as a traffic router, routing traffic from/to other nodes of the network. Thus, even if the radio range of the network nodes is relatively limited, the network can cover a wide area, because nodes that are not directly interconnected can nevertheless communicate with each other via a multi-hop transmission.

Reference numeral 110 denotes a functional entity, like a server, connected to the MANET 100 through an infrastructured network 115, and configured to centrally manage the deployment to, and implementation of security policies in the MANET nodes 105. The infrastructured network may include one or more Public Switched Telephone Network (PSTN) and/or one or more mobile telephony networks like GPRS or UMTS networks; the nature and type of the infrastructured network 115 is per-se not limitative to the present invention. The MANET 100 may in particular constitute an "extension" of the infrastructured network 115, by means of which services offered by the network operator to users of the infrastructured network 115 can also be offered to users of the mobile network nodes 105. The MANET 100 may also operate as a replacement of the infrastructured network 115 in case of failure of the latter.

In particular, the server 110 may be managed by an administrator of the MANET 100, for example an administrator operating on behalf of the operator of the infrastructured network 115 MANET 100. By means of the server 110, the network administrator keeps a control on the traffic exchanged through the MANET 100, defining security policies to be applied by the MANET nodes 105; the security policies may for example be deployed dynamically via the infrastructured network 115 and the MANET 100.

According to the present invention, it is ensured that the desired security policies are effectively applied and respected, i.e. that the security policies are enforced.

According to an embodiment of the present invention, a Distributed Firewalling Architecture (DFA) is implemented in the MANET 100, adapted to set-up a distributed firewalling mechanism, according to which the firewalling operations are entrusted to the MANET nodes 105. The generic MANET node 105 behaves as a client (hereinafter referred to as a Distributed Firewalling Architecture client or, shortly, "DFA client") in respect of the server 110 (hereinafter referred to as the "DFA server"). The client resident in the generic MANET node 105, schematically depicted in the drawing and denoted 120, is adapted to dynamically receive from the DFA server 110 security policies to be applied in the MANET, to interpret the received security policies and to translate them into lower-level traffic filtering rules (e.g., Internet Protocol—IP—filtering rules), used for filtering the traffic that is routed by the MANET nodes, as will be described in detail later.

According to an embodiment of the present invention, the generic MANET node 105 does not filter its own traffic, i.e. the traffic it originates or that is destined thereto, rather it filters the traffic of the other MANET nodes, particularly of the neighbouring MANET nodes; in other words, considering the generic MANET node 105, its traffic is filtered by one or more of the neighbouring MANET nodes.

In particular, according to an embodiment of the present invention, an efficient traffic filtering policy is implemented, which provides for entrusting the network traffic filtering operation to a subset of MANET nodes, particularly to the neighbouring nodes of a node that is either the source of the data traffic or the destination of the data traffic. In this way, it is avoided that every MANET node has to apply the security policies, i.e. the data traffic filtering rules valid for all the MANET nodes, and has to compare to such rules every data packet received before routing it. In other words, according to an embodiment of the present invention, the filtering of a data packet sent by a certain source or origin node, like the network node denoted 105s in FIG. 1, towards a certain destination, like the network node 105d in the drawing, is carried out only by the (DFA client resident on the) node 105a that, along the route 125 followed by the data packet, immediately follows the source node, and by the node 105b that, along said route, immediately precedes the destination node.

In particular, in an embodiment of the present invention, indications about the network topology are exploited to identify which MANET nodes have to filter the data traffic; in particular, said network topology indications are included in and propagated by routing messages from which the generic DFA client 120 can derive, in real time, which are the MANET nodes with which it can communicate. In particular, the knowledge of the distance from each node, in terms of number of hops, enables the DFA client 120 resident on the generic MANET node 105 to classify the nodes of the MANET as neighbouring nodes and distant nodes; for the purposes of the present description and claims, by "neighbouring node" it is meant a MANET node that is one hop distant from the generic node, whereas by "distant node" it is meant a MANET node more than one hop distant from the generic node. In this way, the DFA client 120 resident on the generic MANET node 105 is adapted to dynamically configure itself, adding and/or removing security policy rules based on the changes in the network topology, and actuating only the rules that are associated with the nodes it knows, i.e. its neighbouring nodes.

Entrusting the enforcement of the security policies defined in respect of a certain MANET node 105, like for example the node 105s in FIG. 1, to the (DFA client 120 resident on the) neighbouring nodes, i.e. the node 105a in the example of FIG. 1, avoids that the remaining, successive nodes on the route 125 followed by a data packet sent by the node 105s (like the node 105c in the shown example) have to perform filtering operations on the same data traffic, because this filtering operation is useless, since assumed that the filtering has been made by the node 105a the traffic inherently complies with the prescribed security policies.

The further filtering entrusted to the node that, like the node 105b in the example of FIG. 1, immediately precedes the data packet destination node 105d is not essential, but it increases the overall network security.

In addition to the distributed firewalling architecture and mechanism described above, according to an embodiment of the present invention, a distributed firewall control architecture is implemented in the MANET 100, adapted to set-up a distributed control mechanism for detecting the presence, in the MANET 100, of traffic not compliant with a certain security policy, and, in case such non-compliant traffic is detected, to identify the node(s) which has not properly enforced the security policy, as well as to identify the node(s) that violated the security policy, and to consequently take proper countermeasures. The distributed control mechanism allows avoiding that unauthorized traffic, generated by a node that violated the security policies, and not properly filtered by the client DFA on the node entrusted with the security policies enforcement (the node that immediately follows the source node), is routed through several network nodes before being filtered out, for example by the node that immediately precedes the destination node, with a consequent saving of network nodes' power and bandwidth resources.

Figure 2:
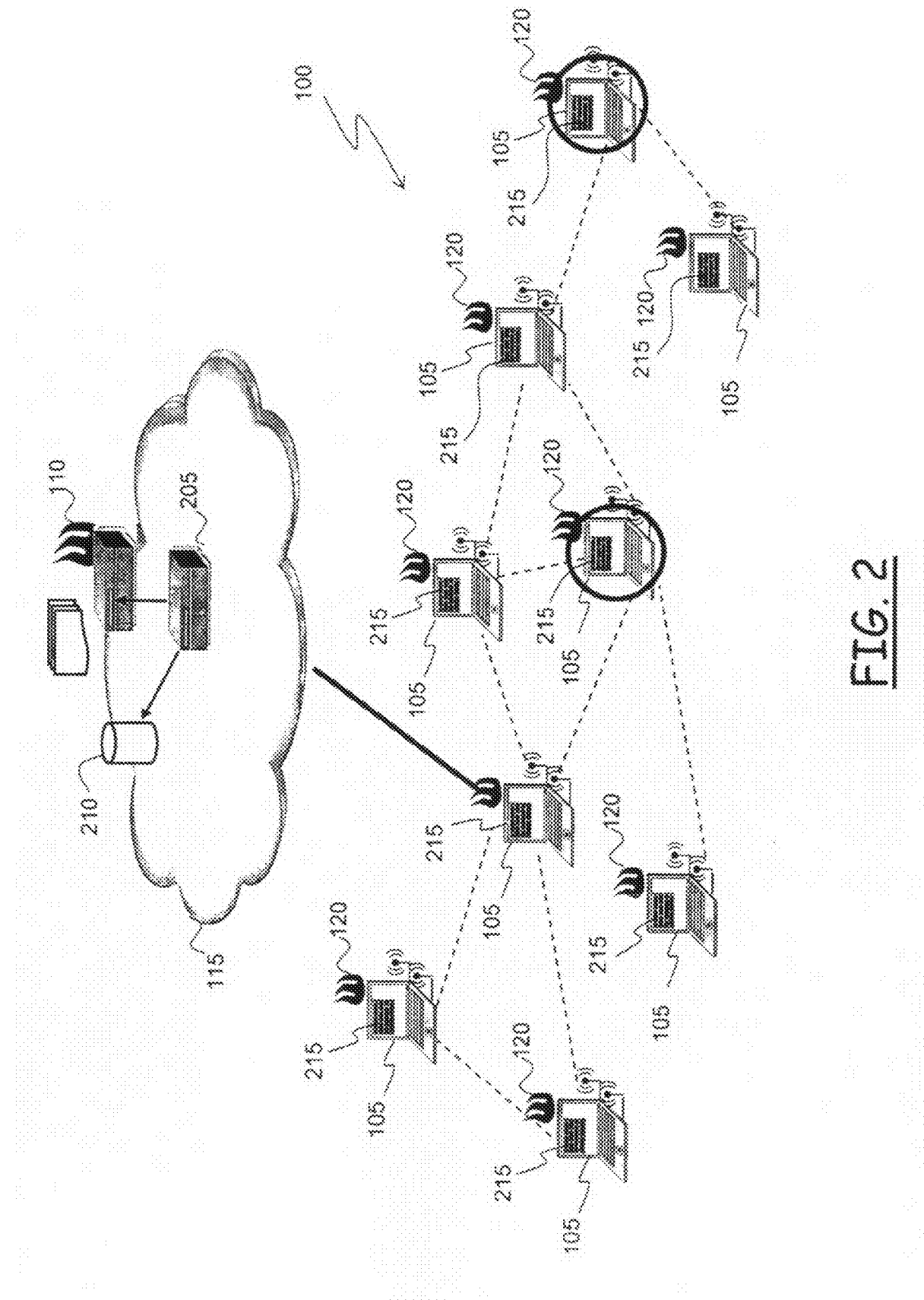
FIG. 2 schematically shows network elements implementing a Distributed Firewall Control (DFC) architecture, according to an embodiment of the present invention.

According to an embodiment of the present invention, as schematically shown in FIG. 2, the distributed firewall control architecture comprises a distributed firewall control server (hereinafter shortly referred to as "DFC server") 205, possibly, albeit not limitatively, co-located with the DFA server 110. The DFC server 205 is configured to centrally manage and coordinate a distributed firewall control mechanism, taking proper countermeasures in respect of MANET nodes that do not properly enforce the security policies and nodes that violate the security policies defined for the MANET; the DFC server 205 interacts with the DFA server 110 and, possibly, with further entities forming a security platform of the MANET, like for example one or more authentication servers 210.

Like in the scenario of FIG. 1, each MANET node 105 acts as a client (DFA client) of the DFA server 110, i.e. as an enforcer of the firewalling policies defined for the nodes that, at a certain time, are its neighbours. In addition to the DFA client, a DFC client 215 is resident on each MANET node 105, adapted to detect the proper application of the security policies by the DFA clients, i.e. by the security policies enforcers.

Additionally, on the generic MANET node 105 one or more applications designed to implement the desired routing protocol are assumed to be resident (not shown in the drawing), adapted to set up the data packets routes for reaching nodes that are distant more than one hop. In particular, said routing protocol is assumed to be a proactive routing protocol. As known to those skilled in the art, routing protocols defined for MANETs are generally classified as proactive protocols and reactive protocols, depending on how the routes towards the destination nodes are determined; in proactive protocols, every node periodically propagates to the network its topological information so that each node in the MANET is able to build the network map and to calculate a path to reach every node. With reactive protocols, the generic node calculates a path towards another node only at the time the former node has to send data to the latter node.

Figure 3:
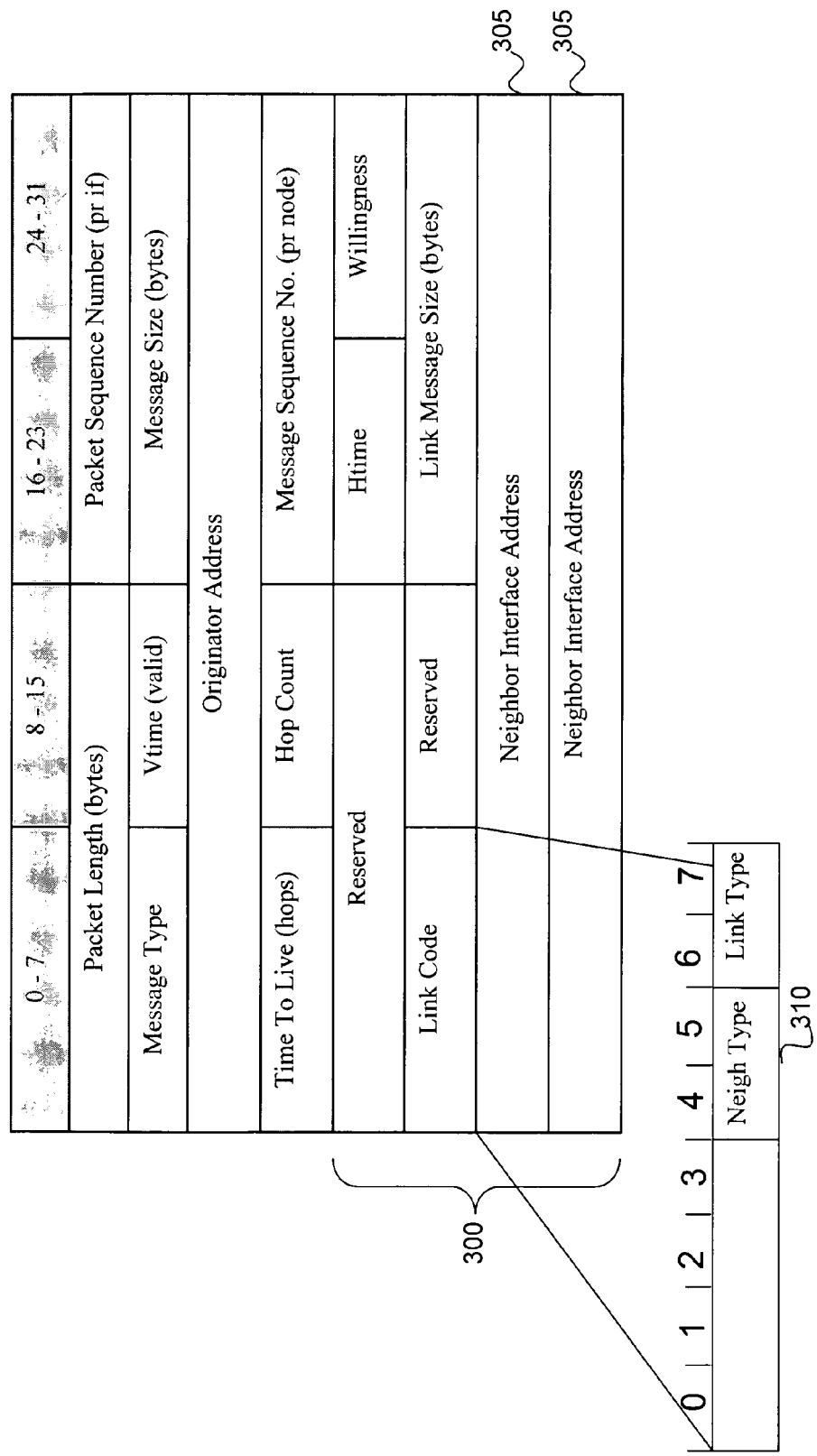
FIG. 3 describes a format of HELLO messages exploited by a routing protocol adopted in the MANET.

In particular, according to an embodiment of the present invention, the routing protocol adopted is the Optimized Link State Routing (OLSR) protocol, described for example in T. Clausen, P. Jacquet, "Optimized Link State Routing Protocol (OLSR)", RFC 3626, October 2003. The OLSR protocol uses a broadcast algorithm exploiting a subset of the MANET nodes 105, referred to as the MultiPoint Relay (MPR), specifically for the propagation of the routing messages. Each node that implements the OLSR routing protocol builds its own set of MPR nodes (the "MPR set"), by means of a procedure called "neighbour detection", and gets indications about the lists of nodes that are distant one or two hops therefrom; then, the considered node elects as MPR node one of the neighbouring nodes with which there is a bidirectional link (a "symmetric neighbour"), which allows the considered node to reach another node distant two hops. In this way, the union of the areas covered by the radio ranges of all the MPR nodes elected by one generic node covers all the nodes that are distant two hops therefrom. Each node sends to its neighbouring nodes the respective set of elected MPR nodes through particular OLSR protocol messages, referred to as "HELLO" messages; the structure of a HELLO message is pictorially shown in FIG. 3. The HELLO message, globally denoted 300, includes one or more fields 305 called "Neighbour Interface Address", wherein each node inserts the network addresses (IP addresses) of its neighbouring nodes, distant one hop, and a field 310 called "Neighbour Type", wherein each node defines if the node with neighbour interface address is an MPR for it. For example, referring to scenario shown in FIG. 4, wherein an exemplary network topology 400 is depicted, node 405a inserts into the fields 305 of the HELLO messages it sends the addresses of nodes 405b, 405c, 405d and 405e; among these nodes, node 405a elects as MPR node only the node 405e, thus, in the HELLO messages, it sets for this node the field 310 to a value "MPR_NEIGH", to indicate that the node 405e is an MPR.

The nodes that are elected MPR nodes, in addition to sending their own HELLO messages, periodically send "TOPOLOGY CONTROL" ("TC") messages; the structure of a TC message is pictorially shown in FIG. 5A: the message, globally denoted 500, includes a plurality of fields 505 called "Advertised Neighbour Main Address", each one adapted to contain the address of one network node that has elected the considered node as its MPR. In this way, each network node can build its own routing table: the routes towards all the possible destinations are calculated passing through the MPR nodes elected by each node.

According to an embodiment of the present invention, the firewall control mechanism implemented by the DFC architecture advantageously exploits the principles of operation of the OLSR routing protocol and the correspondingly obtained network topological indications, in order to limit the number of controls to be performed to a subset of the MANET nodes. In particular, also the MANET data traffic is caused to pass through the nodes that are elected MPR nodes in respect of the OLSR protocol. This is achieved by causing every node, when building the respective routing table, to configure as next-hop for reaching a desired destination one of the MPR nodes which have been elected by that node. In this way, a first optimization of the DFC mechanism is achieved, that allows performing the firewall control function only on the MPR nodes, i.e. only on those nodes that actually handle the routing of data traffic from/to the other nodes. The MPR nodes form altogether a relatively small subset of all the MANET nodes (in FIG. 4, the MPR nodes are shown as encircled, and the subset of MPR nodes is denoted 450). Thus, the subset of MPR nodes becomes the set of the DFA clients 120 that are subjected to controls in order to guarantee that the security policies defined for the MANET are actually applied and enforced.

Additionally, the DFC client 215 resident on the generic network node is adapted to choose, within the above-mentioned subset 450 of DFA clients 120 to be controlled, that or those DFA clients on which to perform the control, by means of a nodes selection mechanism.

According to an embodiment of the present invention, the nodes selection mechanism enables the generic DFC client 215 to:

limit the number of controls it has to perform to a small, possibly the smallest number of DFA clients 120 (ideally, a DFC client may have to control just one DFA client); and guarantee that the choice of the node to control does not jeopardize the possibility of controlling a different DFA client 120; in other words, all the DFA clients belonging to the above-mentioned subset 450 of the MPR nodes should be controlled by at least one DFC client.

Figure 4:
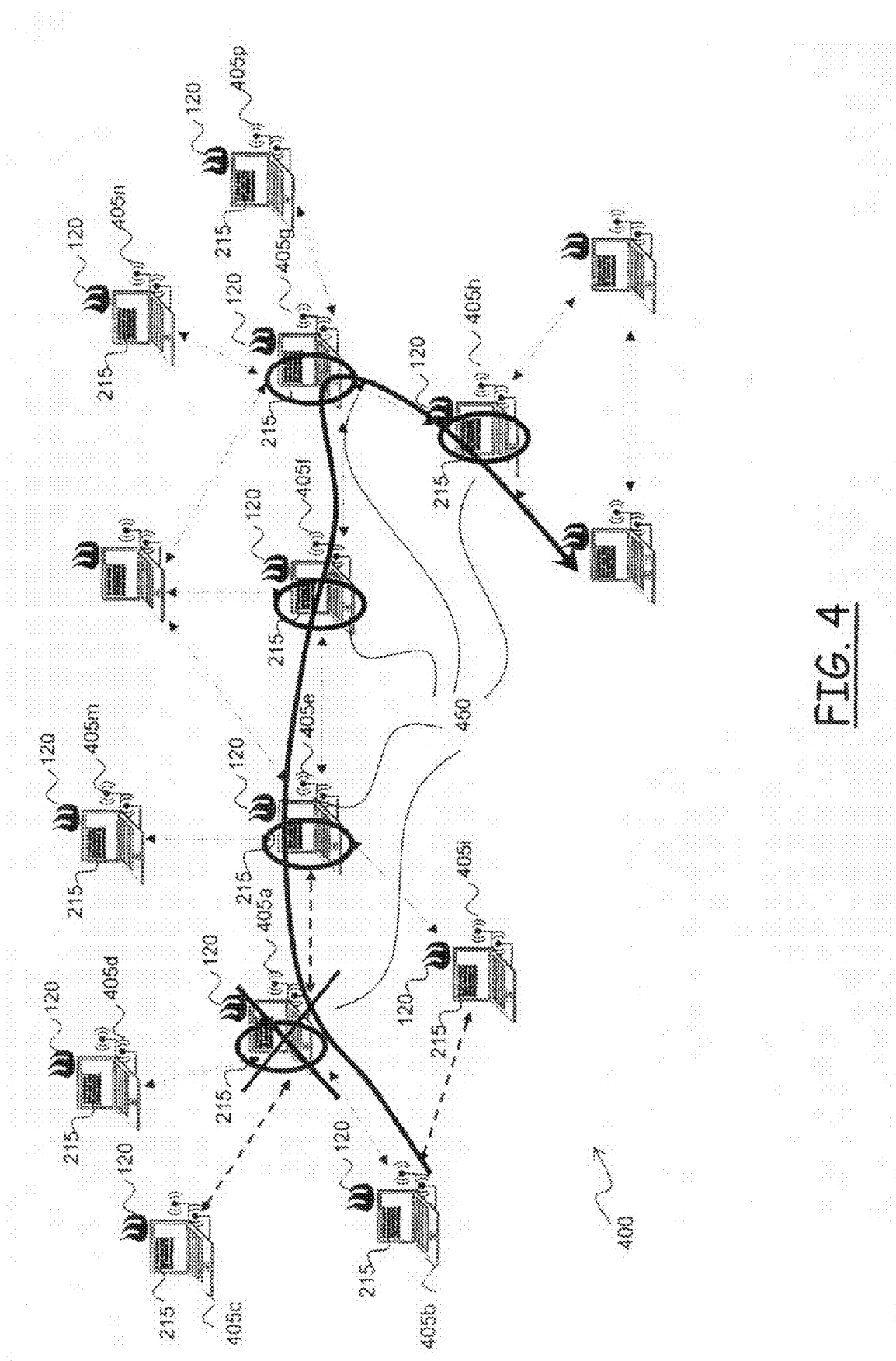
FIG. 4 schematically shows an example of application of a DFC mechanism implemented by the DFC architecture of FIG. 2.

Hereinafter, the DFC mechanism according to an embodiment of the present invention is described in detail, applied to the exemplary MANET shown in FIG. 4. It is assumed that the nodes denoted 405a, 405e, 405f, 405g and 405h (shown as encircled) are the elected MPR nodes elected by the routing process of the OLSR; the nodes 405a, 405e, 405f, 405g and 405h thus represent the subset 450 of the DFA clients 120 that are to be controlled. Each DFC client 215 knows this subset of nodes 405a, 405e, 405f, 405g and 405h based on the topological indications acquired by the routing protocol.

Essentially, the DFC mechanism includes three phases.

In a first phase, based on the subset of nodes thus built, each DFC client 215 chooses one DFA client 120 (i.e., one node) within the subset of nodes to be controlled, using the above mentioned selection mechanism.

A second phase and a third phase, described in detail later on, concern actions to be taken in case it is ascertained that the security policies are not properly implemented; the actions that, according to an embodiment of the present invention, can be taken are a local repair action and a global repair action.

In an embodiment of the present invention, the selection mechanism adopted for selecting the DFA clients 120 to be controlled is the following.

Each DFC client 215, residing on a certain network node 105, firstly assesses the number of MPR nodes that have been elected by the network node where such DFC client 215 resides.

If the number of elected MPR nodes is equal to 1, then the DFA client to be controlled is the sole MPR node that has been elected. Referring to the example of FIG. 4, the node 405c is assumed to have elected as MPR only the node 405a, thus the DFC client 215 resident on node 405c controls the DFA client 120 resident on node 405a.

Figure 6:
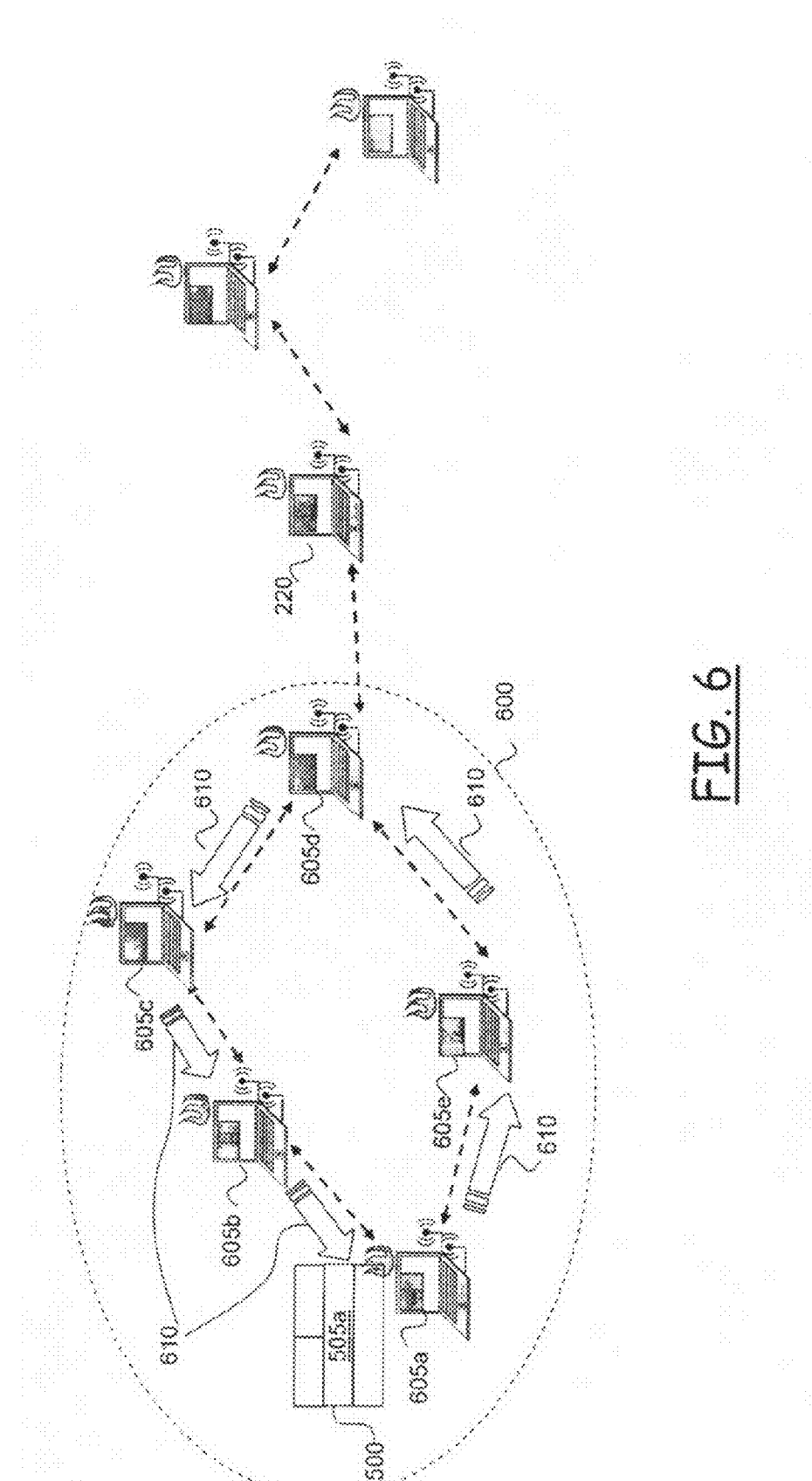
FIG. 6 schematically shows a DFC selection mechanism in case of a loop.

If instead the number of elected MPR nodes is greater than 1, the DFC client 215 assesses whether the node where it resides is involved in a loop, i.e. it is part of a closed path, originating at and terminating in a same node; in the example depicted in FIG. 6, a loop 600 exists, originating at node 605a, passing through nodes 605b, 605c, 605d and 605e, and terminating in node 605a. The assessment of the existence of loops by the generic DFC client is for example carried out using the MPR selector set transmitted by every MPR node in the TC messages it sends (the MPR selector set is the group of node addresses contained in the fields Advertised Neighbour Main Address 505 of the TC message 500 depicted in FIG. 5A); as mentioned in the foregoing, this information allows building up a path from a certain source node to a certain destination node.

If the DFC client ascertains that there is a loop originating at and terminating in the node where it resides, like in the case of the DFC client 215 residing on node 605a of FIG. 6, then the DFC client 215 decrees that the node where it resides is involved in a loop.

In case no loops are identified, the DFC client 215 chooses to control, among the MPR nodes elected by the node where it resides, the MPR node through which the lowest number of nodes distant two hops can be reached. Referring to the example of FIG. 4, let it be assumed that the node 405e has elected as MPR the nodes 405a and 405f; through the node 405a, the node 405e can reach the nodes 405b, 405c and 405d, distant from it two hops, whereas through the node 405f it can only reach the node 405g: thus, the DFC client resident on the node 405e chooses to control the DFA client 120 resident on the node 405f. If two or more MPR nodes allow reaching the same number of nodes distant two hops, then the DFC client 215 chooses as DFA client to control the one resident on a node which, in turn, has elected the lowest number of MPR nodes. If even in this way two or more nodes are identified, then the choice is made randomly. This is for example the case of node 405f of FIG. 4, which has elected as MPR nodes the nodes 405e and 405g; through the node 405e, the node 405f can reach the nodes 405a, 405i and 405m, whereas through the node 405g it can reach the nodes 405h, 405n and 405p, all distant two hops. Not being able to make a discrimination, between the nodes 405e and 405g, then the node 405f looks which, among the nodes 405e and 405g, has elected the lowest number of MPR nodes: the node 405e has elected as MPR nodes the nodes 405a and 405f, whereas the elected MPR nodes of the node 405g are the nodes 405f and 405h; again, it is not possible to discriminate between the nodes 405e and 405g, so the DFC client resident on the node 405f performs a random choice, and for example the choice is made of node 405g.

Let now the case be considered that loops exist. In the worst case, for each DFA client 120 there is only one DFC client 215 that can control it. It is therefore necessary to avoid that two DFC clients 215 choose to control a same DFA client 120, otherwise it may happen that the control of (the DFA client 120 resident on) all the nodes in the subset 450 of elected MPR nodes is not guaranteed. In this case, the DFC client 215 should select the DFA client 120 to control following a certain control direction, denoted 610 in the example of FIG. 6. In particular, according to an embodiment of the present invention, the control direction is defined by the node, in the loop, having the numerically lowest IP address; for example, making reference to FIG. 6, and assuming that the IP addresses of the nodes 605a, 605b, 605c, 605d and 605e are 210, 212, 214, 216 and 218, the numerically lowest address is 210. In the TC message 500 transmitted by the node 605a, each DFC client 215 identifies the first node 505a announced in the MPR selector set among those making part of the loop. Thus, each DFC client 215 chooses, as DFA client 120 to control, the one residing on the MPR node that, starting from the node where the considered DFC client 215 resides and passing through the node in the loop having lowest IP address, allows reaching the first node 505 announced in the MPR selector set in the TC message. Referring to the example of FIG. 6, a loop 600 exists formed by the nodes 605a, 605b, 605c, 610d and 610e; in this case, the node of the loop 600 having the lowest IP address is the node 605a (IP address=210), so this node 605a is the one defining the control direction to be followed. All the DFC clients 215 resident on the nodes of the loop 600 look at the MPR selector set announced by the node 605a in the TC messages it sends; in this example, the MPR selector set is assumed to be formed by the nodes 605e and 605b, and it is also assumed that the node 605e is the first to be announced in the MPR selector set (this node is also part of the loop). Thus, the control direction 610 to be followed is the direction that, passing through the node 605*a* (i.e. the node with lowest IP address in the loop), allows reaching the node 605*e* (the first announced node in the MPR selector set). The DFC client 215 resident on the node 605*c* thus chooses to control the DFA client 120 resident on the node 605*b*, which allows it to reach the node 605*e* passing through the node 605*a*; similarly, the DFC client 215 resident on the node 605*d* chooses to control the DFA client 120 resident on the node 605*c*, which allows it reaching the node 605*e* passing through the node 605*a*. In this way, each node of the loop is controlled by another node.

Hereinafter, examples of countermeasures that can be taken when it is detected a violation of the security policies will be described.

Local Repair Mechanism

The local repair mechanism calls for placing in quarantine the network node where a DFA client 120 resides which has not properly enforced the security policies defined for the MANET. The quarantine has effect locally to the MANET (i.e. the DFC server 205 is not involved) and it is directed to temporarily isolate the detected node on which the DFA client 120 which has not properly enforced the security policies resides.

In particular, in an embodiment of the present invention, the quarantine mechanism is applied to a generic node a maximum, predetermined number of times, defined for example by a threshold value: once a node has been put in quarantine the maximum number of times, a global repair mechanism (described later on) can be applied to that node.

The choice of allowing a DFA client 120 to be put in quarantine more than once is motivated by the fact that an incorrect enforcement of the security policies might be caused by a temporary misalignement of a DFA client 120 with the DFA server 110, due for example to an ongoing update of the security policies, or to a delay of convergence of the routing protocol, thereby the topological indications used for applying the security policies may not be sufficiently up to date.

Every DFC client 215 performs an active control of the DFA client 120 that has been selected for being controlled, by means of a continuous monitoring of the (entering and exiting) traffic flowing through the node hosting the controlled DFA client 120, so as to detect cases of missed enforcement of the security policies.

Each time a DFC client 215 detects an improper application of the security policies defined for the MANET, it stores data, schematized in FIG. 5B and denoted therein as 507, comprising:

the IP address (IP_S) 510 of the node originating the data packets that violate a certain security policy;

the IP address (IP_D) 515 of the destination node of those data packets;

the MAC (Media Access Control) address (MAC_in) 520 of the node originating the incoming traffic entering into the node hosting the controlled DFA client 120; this MAC address MAC_in corresponds to the node that has routed the traffic to the node hosting the DFA client 120 being controlled;

the identifier (ID) 525 of the traffic session.

Additionally, every DFC client 215 keeps, for all the MANET nodes, an association between the IP address IP_S of the source node and the related MAC address MAC_S (field 530).

Based on this data, the DFC client 215 starts the local repair procedure, which calls for:

identifying the DFA client 120 that has not properly enforced the security policies; and put in quarantine the network node on which the identified DFA client 120 resides.

To identify the DFA client 120 that has not properly enforced the security policies, the DFC client 215 exploits the data 507, particularly the MAC address MAC_in 520 of the traffic entering the controlled DFA client 120, as well as the routing table; as known to those skilled in the art, the routing table, schematically depicted in FIG. 5C and denoted therein as 550 is a table that the generic node uses to know how to reach any other network node, and wherein the number of hop counts necessary to reach the other nodes is specified. Using the data contained in the routing table 550, the DFC client 215 is capable of determining how far is, in terms of hops number ("hop count"), the source node, whose address is the IP_S.

Figure 7:
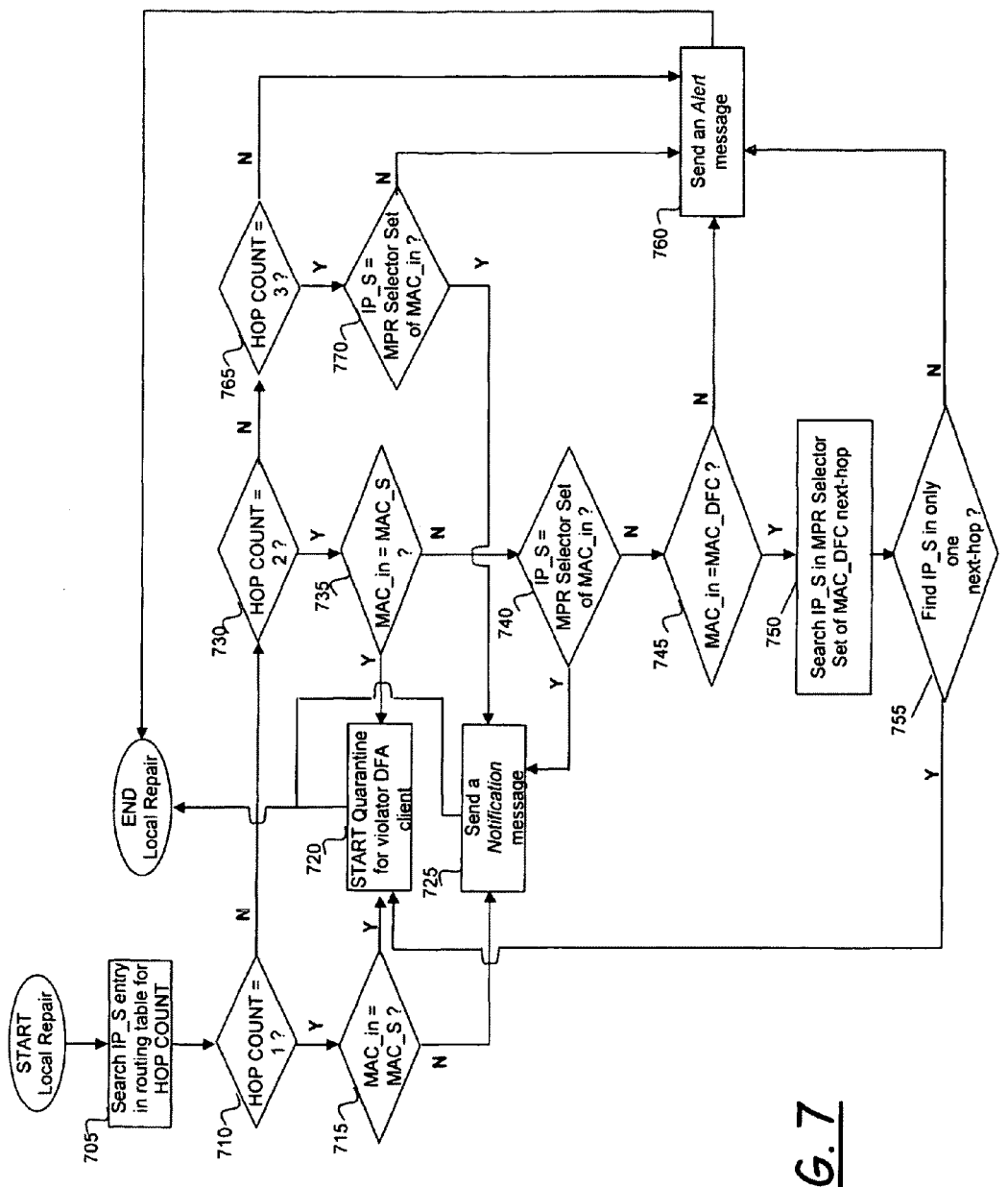
FIG. 7 is a schematic flowchart of a node identification mechanism for identifying the network node that has not enforced the prescribed security policies, according to an embodiment of the present invention.

The procedure for identifying the DFA client 120 that has not enforced the security policies is schematized by the flowchart of FIG. 7.

Firstly, the DFC client searches, in its routing table, the entry corresponding to the node having address equal to IP_S, i.e. the source node originating the traffic that violated the security policy, so as to derive the corresponding hop count value (block 705).

If the hop count value is equal to 1 (block 710, exit branch Y), then the node with address IP_S is directly reachable by the node where the DFC client 215 resides. The DFC client 215 checks whether the MAC address MAC_in of the traffic entering the controlled DFA client 120 coincides with the MAC address MAC_S of the source node (block 715). In the affirmative case (exit branch Y of block 715), the (node hosting the) controlled DFA client 120 is thus responsible of the security policies violation (i.e., it is the security policy violator node): the DFC client 215, being the next hop in respect of the security policies violator node, puts the latter node in quarantine (block 720).

Considering the exemplary situation depicted in FIG. 8A, let the traffic originated by node 805*a* and destined to node 805*b* be considered, and let it be assumed that the node 805*a* is not authorized, by the security policies defined for the MANET, to generate such traffic. In such a case, the node 805*c*, is a direct neighbour of the source node 805*a*, and the node 805*d* is a direct neighbour of the destination node 805*b*. The two nodes 805*c* and 805*d* are responsible of enforcing the security policies, blocking the traffic generated by the node 805*a*. Let it be assumed that the DFA client 120 resident on the node 805*c* does not enforce the security policies, and lets the traffic originated by the node 805*a* pass through. The DFA client 120 resident on the node 805*c* is thus the security policies violator, which should be identified by the DFC mechanism. Let it be assumed that the DFC client 215 resident on a node 805*e* is the controller of the DFA client 120 hosted by the node 805*c*: inspecting the traffic exiting the node 805*c*, the DFC client 215 hosted by the node 805*e* is able to detect that the traffic having IP_S equal to that of the node 805*a* is not authorized in the MANET. Looking at its routing table, the DFC client 215 hosted by node 805*e* determines that the hop count value for the node 805*a* is equal to 1, and that the MAC address MAC_in of the traffic entering the controlled DFA client 120 hosted by node 805*c* coincides with the MAC address MAC_S of the source node 805*a*. Thus, the DFC client 215 hosted by node 805*e* determines that the controlled DFA client 120 has not enforced the security policies, and it is a security policies violator: being the controller node 805*e* a direct neighbour of the violator node 805*c*, the controller node 805*e* directly puts the violator node 805*c* in quarantine.

Referring back to FIG. 7, if the two MAC addresses MAC_in and MAC_S do not coincide (exit branch N of block 715), the DFA client 120 that has not enforced the security policies resides on the node that, along the route from the source node (IP address IP_S) to the destination node (IP address IP_D) precedes the controlled DFA client 120, i.e. on the node whose MAC address is MAC_in (in fact, the node responsible of enforcing the security policies is the next hop of the source node, with IP address IP_S, so it cannot be the controlled DFA client 120, because the latter is distant two hops). The DFC client 215, not being the next-hop of the security policies violator node, does not directly put the violator node in quarantine: it instead broadcasts an alarm signal, particularly a NOTIFICATION message (block 725), described in detail later on, for notifying to the other MANET nodes that the identified DFA client 120 has not properly enforced the security policies, for asking the neighbouring nodes to put the violator node in quarantine, and for asking the nodes that are along the route from the source node to the destination node to temporarily apply the violated security policies.

Considering the exemplary situation depicted in FIG. 8B, let the traffic originated by the source node 805a and destined to the destination node 805b be considered, assuming that the node 805a is not authorized, by the security policies defined for the MANET, to generate such traffic. Node 805c is a direct neighbour of the source node 805a, and node 805d is a direct neighbour of the destination node 805b: the two nodes 805c and 805d are thus responsible of enforcing the security policies, blocking the traffic generated by the node 805a. Let it be assumed that the DFA client 120 resident on node 805c does not enforce the security policies, and lets the traffic originated by node 805a pass through; the node 805c is thus the security policies violator, that should be identified by the DFC mechanism. The DFC client 215 resident on node 805f is the controller of the DFA client 120 resident on node 805g. Inspecting the traffic leaving node 805g, the DFC client 215 resident on node 805f detects that the traffic source IP address IP_S corresponding to the IP address of the source node 805a is not authorized in the MANET. Based on its routing table, the DFC client 215 resident on node 805f derives that the hop count value for the source node 805a is equal to 1, but the MAC address MAC_in of the traffic entering the controlled DFA 120 client resident on node 805g differs from the MAC address MAC_S of the source node 805a. Thus, the DFA client 120 that has not enforced the security policies resides on the node having MAC address equal to MAC_in, i.e. on the node 805c. The DFC client 215 resident on the node 805f cannot directly put in quarantine the violator node 805c, thus it broadcasts a NOTIFICATION alarm message.

Referring back again to FIG. 7, if the hop count is not equal to 1 (exit branch N of block 710), the DFC client 215 ascertains whether the hop count value is equal to 2 (block 730).

If the hop count value is equal to 2 (exit branch Y of block 730), then the source node originating the traffic in violation of the security policies is not directly reachable by the DFC client 215. The DFC client 215 then checks if the MAC address MAC_in of the traffic entering the controlled DFA client 120 coincides with the MAC address MAC_S of the source node (block 735). In the affirmative case (exit branch Y of block 735), the DFA client 120 controlled by the considered DFC client 215 is responsible of the security policies violation, i.e. it is the violator node. The DFC client 215, being in this case a next hop of the violator node, directly puts the violator node in quarantine (block 720).

Figure 8C:
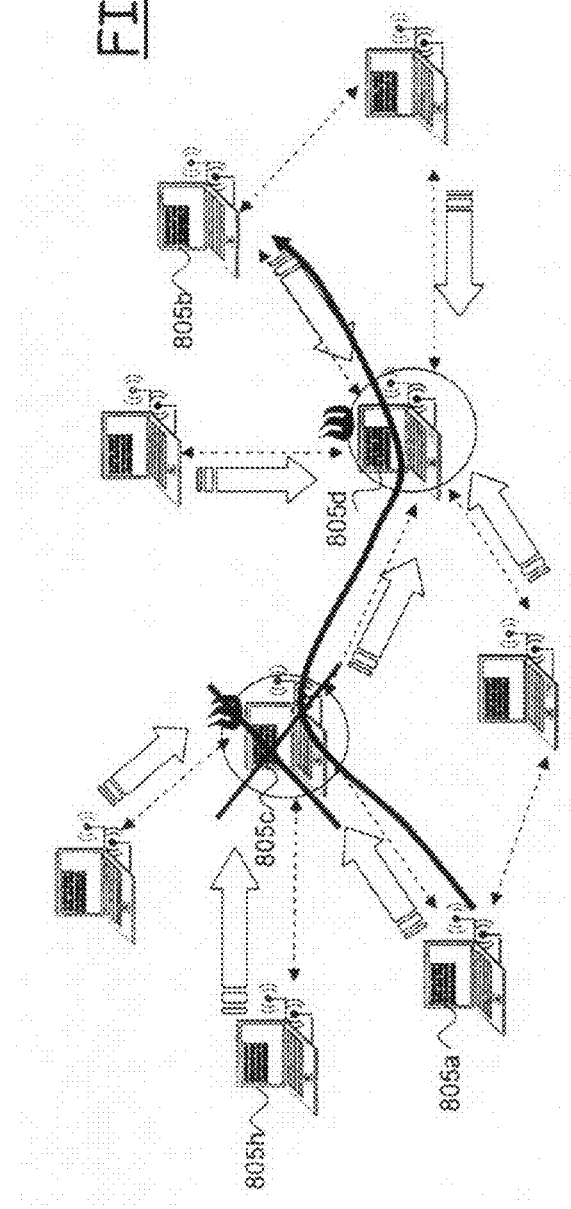

Referring to the exemplary scenario depicted in FIG. 8C, let the traffic originated by source node 805a and destined to the destination node 805b be considered, and let it be assumed that the source node 805a is not authorized, based on the security policies valid for the MANET, to generate such traffic. In this situation, node 805c is a direct neighbour of the source node 805a, and node 805d is a direct neighbour of the destination node 805b. The two nodes 805c and 805d are thus responsible of the enforcement of the security policies, blocking the traffic generated by the source node 805a. Let it be assumed that the DFA client 120 resident on the node 805c does not enforce the security policies, letting the traffic originated by the source node 805a pass through: the (DFA client 120 on) node 805c is thus the security policies violator, that should be identified by the DFC mechanism. The DFC client 215 resident on node 805h is one of the controllers of the DFA client 120 on node 805c. Inspecting the traffic exiting the node 805c, the DFC client 215 resident on node 805h detects that the traffic with source IP address IP_S equal to the IP address of the source node 805a is not authorized in the MANET. Looking at its routing table, the DFC client 215 resident on node 805h derives that the hop count value for the source node 805a is equal to 2, and that the MAC address MAC_in of the traffic entering the controlled node 805c coincides with the MAC address MAC_S of the source node 805a. Thus, the DFA client 120 resident on node 805c controlled by the DFC client 215 resident on node 805h has not enforced the security policies, and node 805c is the violator; since the controller node 805h is a next-hop of the violator node 805c, the DFC client 215 resident on node 805h directly puts the violator node 805c in quarantine.

Back to FIG. 7, if the two MAC addresses MAC_in and MAC_S do not coincide (exit branch N of block 735), the DFC client 215 checks if the IP address IP_S of the source node is included in the MPR selector set announced in the TC messages issued by the node having the MAC address MAC_in of the traffic entering the controlled node (block 740).

In the affirmative case (exit branch Y of block 740), the security policy violator node is the node which, along the route from the source node (with IP address IP_S) to the destination node (with IP address IP_D), precedes the controlled node, i.e. the node having MAC address equal to MAC_in. In such a case, the considered DFC client 215, not being the next hop of the violator node, cannot directly put the latter in quarantine, so the DFC client 215 broadcasts a NOTIFICATION alarm message (block 725), concerning the violator node.

Figure 8D:
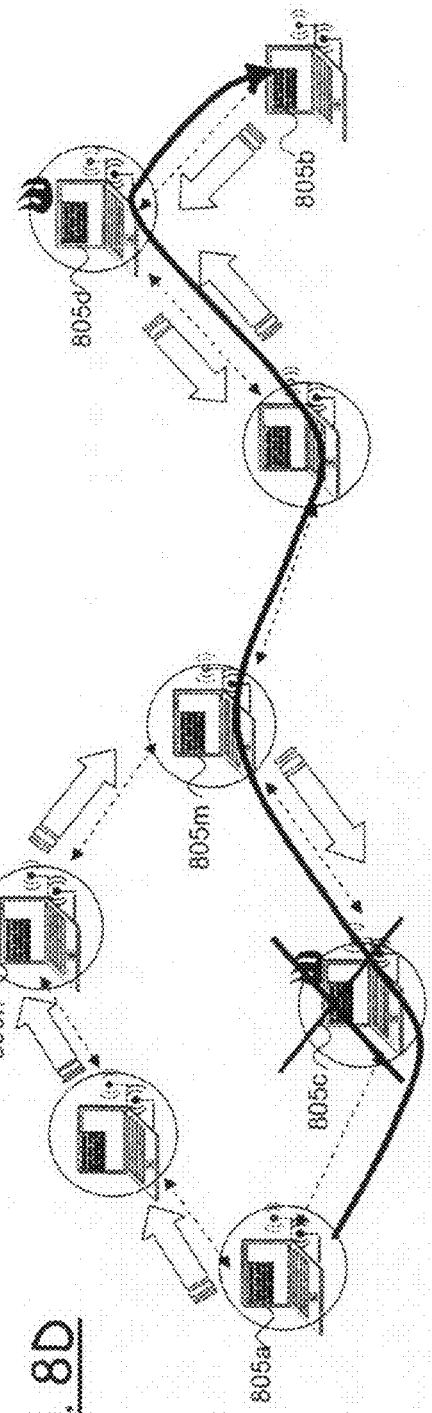

Referring to the exemplary scenario shown in FIG. 8D, let it be assumed that there is a traffic flow originating from the source node 805a and directed to the destination node 805b, assuming that the node 805a is not authorized, by the security policies defined for the MANET, to originate such traffic. Node 805c is a direct neighbour of the source node 805a, and node 805d is a direct neighbour of the destination node 805b; the nodes 805c and 805d are thus responsible of enforcing the security policies, blocking the traffic generated by the source node 805a. It is assumed that the DFA client 120 resident on node 805c does not enforce the security policies, letting the traffic coming from the source node 805a pass through; the node 805c is thus a security policies violator that has to be identified by the DFC mechanism. The DFC client 215 resident on node 805i is the controller of DFA client 120 resident on the node 805m. Inspecting the traffic exiting the node 805m, the DFC client 215 resident on node 805i detects that the traffic with IP address corresponding to the address IP_S of the source node 805a is not authorized. Based on its routing table, the DFC client 215 determines that the hop count value for the source node 805a is equal to 2, and that the MAC address MAC_in of the traffic entering the node 805m does not coincide with the MAC address MAC_S of the source node 805*a*, being instead the MAC address of the node 805*c*. The controller node 805*i* checks whether, in the TC messages sent by the node 805*c*, the IP address IP_S of the source node 805*a* is included in the MPR selector set: thus, the DFA client 120 that has not enforced the security policies (the security policies violator) resides on node 805*c*. In such a case, the node 805*i*, not being a direct neighbour of the security policies violator node, broadcasts a NOTIFICATION alarm message.

Back to FIG. 7, if the IP address IP_S of the source node originating the traffic is not included in the MPR selector set (exit branch N of block 740) announced by the node with MAC address equal to MAC_in, then the DFC client 215 ascertains whether its MAC address coincides with the MAC address MAC_in of the traffic entering the controlled DFA client 120 (block 745). If the two addresses coincides (exit branch Y of block 745), the DFA client 120 that has not enforced the security policies resides on the node that precedes the node hosting the DFC client 215 along the route from the source node (IP address IP_S) to the destination node (IP address IP_D), and thus said DFA client 120 resides on a neighbouring node (a next hop) of the node where the DFC client 215 resides. In order to identify which of its neighbours has not enforced the security policies, the DFC client 215 searches, in the MPR selector set included in the TC messages sent by its neighbours, the IP address IP_S of the source node (block 750). Then, if the IP address IP_S is found, the DFC client 215 checks how many of its neighbours announce the IP address IP_S in their MPR selector set: if only one of the neighbours announces the IP address IP_S in its MPR selector set (exit branch Y of block 755), then such neighbour is the node where the DFA client 120 that violated the security policies resides: the DFC client 215, residing on a node that is a next-hop of the violator node, directly puts the latter node in quarantine (block 720); if instead more than one of the neighbour nodes announces the IP address IP_S, then the DFC client 215, not being able to identify which is the node where the DFA client 120 that violated the security policies resides, broadcasts an alarm message, particularly an ALERT message (block 760).

Figure 8E:
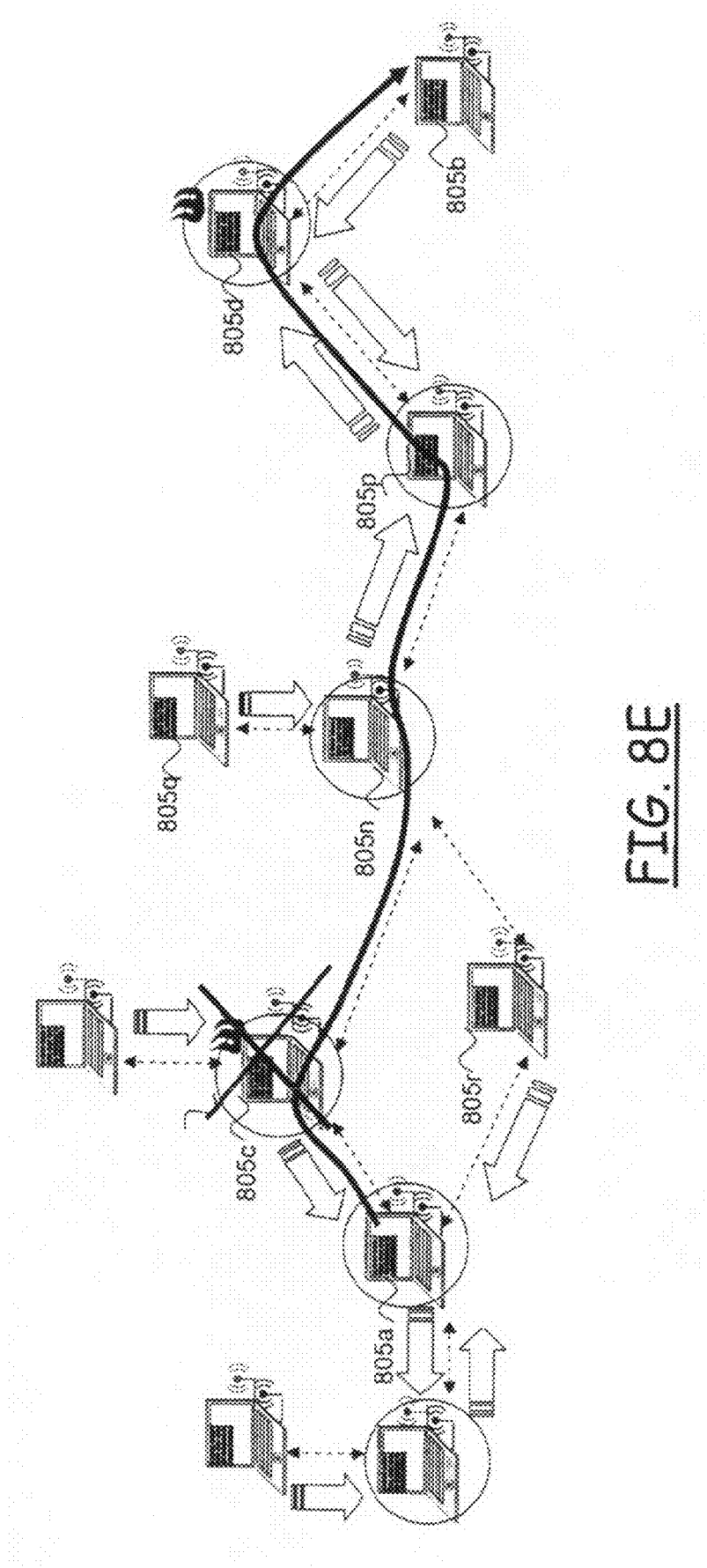

Considering the exemplary scenario depicted in FIG. 8E, let the traffic originated by the source node 805*a* and destined to node 805*b* be considered, assuming that the node 805*a* is not authorized, by the security policies defined for the MANET, to generate such traffic. Node 805*c* is a direct neighbour of the source node 805*a*, and node 805*d* is a direct neighbour of the destination node 805*b*. The two nodes 805*c* and 805*d* are thus responsible of enforcing the security policies, blocking the traffic generated by the node 805*a*. Let it be assumed that the DFA client 120 resident on node 805*c* does not enforce the security policies, letting the traffic originated by node 805*a* pass through: the DFA client 120 resident on node 805*c* is thus the security policies violator, that should be identified by the DFC mechanism. The DFC client 215 resident on node 805*n* is the controller of the DFA client 120 resident on node 805*p*; monitoring the traffic on node 805*p*, the DFC client 215 resident on node 805*n* detects that the traffic having IP address equal to the IP address IP_S of the source node 805*a* is not authorized. Based on its routing table, the DFC client 215 derives that the hop count for node 805*a* is equal to 2, and that the MAC address MAC_in of the traffic entering the controlled DFA client 120 resident on node 805*p* coincides with its own MAC address. In this case, the controller node 805*n* can decree that the DFA client 120 violating the security policies resides on one of its neighbours, particularly on the preceding node along the route from the source node to the destination node. In order to identify which is the violator node, among its neighbours 805*q*, 805*c*, 805*r*, the DFC client 215 resident on the controller node 805*n* checks whether, in the TC messages sent by the neighbour nodes, there is the IP address IP_S of the source node 805*a*. The nodes 805*q* and 805*r*, not being MPR nodes, do not send TC messages (in the drawing, the nodes that have been elected as MPR nodes are encircled). In the considered example, only the node 805*c* sends TC messages containing the IP address IP_S of the source node 805*a*, thus the DFA client 120 that has not enforced the security policies resides on node 805*c*; the node 805*n*, being a direct neighbour thereof, directly puts the violator node 805*c* in quarantine.

Back to FIG. 7, if the hop count is different from 2 (exit branch N of block 730), the DFC client 215 checks whether the hop count is equal to 3 (block 765).

In the affirmative case (exit branch Y of block 765), the DFA client 120 that violated the security policies is not the one controlled by the considered DFC client 215. The DFC client 215 checks if the IP address IP_S of the source node is included in the MPR selector set announced in the TC messages sent by the node having MAC address equal to MAC_in, i.e. the MAC address of the traffic entering the DFA client 120 controlled by the DFC client 215 considered (block 770). In the affirmative case (exit branch Y of block 770), the DFA client 120 that violated the security policies resides on the node that, along the route from the source node (IP address equal to IP_S) to the destination node (IP address equal to IP_D), precedes the node hosting the controlled DFA client 120, i.e. the violator node is the node having MAC address equal to MAC_in. In this case, the DFC client 215 is not a next-hop of the violator node, and cannot directly put the violator node in quarantine; the DFC client 215 thus broadcasts an alarm message, particularly a NOTIFICATION message (block 725) related to the violator node.

Figure 8F:
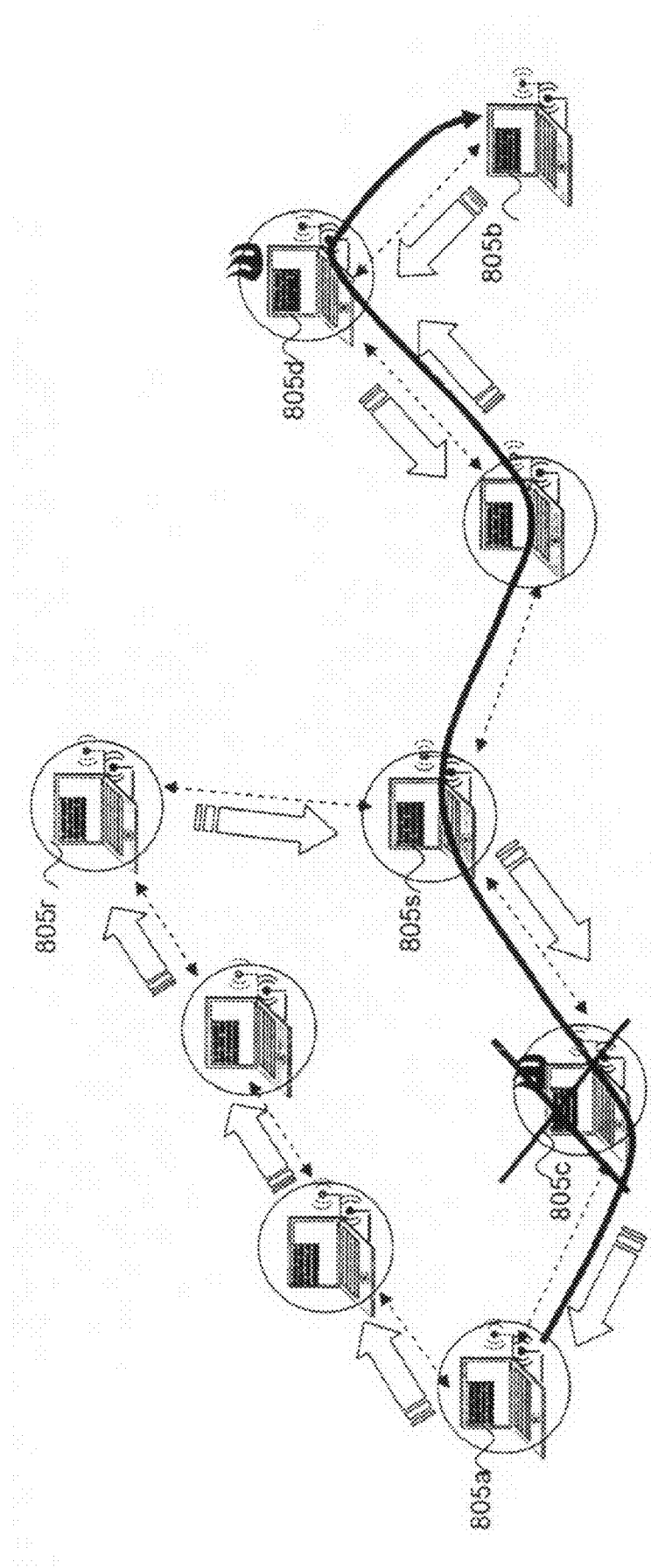

Looking at the exemplary scenario depicted in FIG. 8F, let the traffic originating from source node 805*a* and destined to destination node 805*b* be considered, and let it be assumed that the source node 805*a* is not authorized, by the security policies defined for the MANET, to generate such traffic. Node 805*c* is a direct neighbour of the source node 805*a*, and node 805*d* is a direct neighbour of the destination node 805*b*; the two nodes 805*c* and 805*d* are responsible of enforcing the security policies, blocking the traffic generated by the node 805*a*. It is assumed that the DFA client 120 resident on node 805*c* does not enforce the security policies, letting the traffic generated by the source node 805*a* pass through: the node 805*c* is thus the security policies violator, that should be identified by the DFC mechanism. The DFC client 215 resident on node 805*r* is the controller of the DFA client 120 resident on node 805*s*. Monitoring the traffic on node 805*s*, the DFC client 215 resident on node 805*r* detects that the traffic with IP address equal to that (IP_S) of the source node 805*a* is not authorized; based on its routing table, the DFC client 215 resident on node 805*r* determines that the hop count for the source node 805*a* is equal to 3; the DFC client 215 also checks if the IP address of the source node 805*a* is included in the MPR selector set announced in the TC messages sent by the node having MAC address MAC_in, from which the traffic entering the controlled node 805*s* comes. The violator node 805*c*, having MAC address MAC_in, is thus the node that precedes the controlled node 805*s*. The DFC client 215 resident on node 805*r* is not a next-hop of the violator node 805*c*, thus it cannot directly put the violator node in quarantine: the node 805*r* then broadcasts an alarm message, particularly a NOTIFICATION message related to the violator node 805*c*.

Back to FIG. 7, if the IP address IP_S of the source node is not included in the MPR selector set announced in the TC messages of the node having MAC address equal to the MAC address MAC_in of the traffic entering the DFA client 120 controlled by the DFC client 215 considered (exit branch N of block 770), the DFC client 120 is not able to identify the violator node, and thus simply issues an ALERT message (block 760).

If the hop count is higher than 3 (exit branch N of block 765), the DFA client 120 that did not enforce the security policies is not that resident on the node controlled by the DFC client 215, neither does it reside on the node that precedes the node where the DFA client 120 controlled by the considered DFC client 215 resides, along the route from the source node to the destination node. In this case, the DFC client 215, not being able to determine which is the DFA client 120 that violated the security policies, performs no control on the MAC address MAC_in, and directly broadcasts an alarm message, particularly an ALERT message (block 760). However, the DFA client 120 that did not enforce the security policies has in this case already been identified by the monitoring action performed by the nodes distant 1 or 2 hops from the source node; in fact, the filtering is performed only by the neighbour nodes of the node originating the unauthorized traffic. The control of the nodes more distant than 2 hops, which are not responsible of enforcing the security policies in respect of the source node, is scarcely useful for identifying the DFA client 120 that did not enforce the security policies. Such a control is nevertheless useful to detect unauthorized traffic in the MANET, and thus to alert the nodes along the route from the source node to the destination node, avoiding that such unauthorized traffic is routed further until these nodes receive a NOTIFICATION message (or a QUARANTINE message, as described later) generated as a consequence of the control performed by the DFC clients 215 controlling the DFA clients 120 resident on nodes that are closer to the node originating the unauthorized traffic.

Quarantine

As explained in the foregoing, each time a DFC client 215 detects or is informed by other DFC clients 215 that the DFA client 120 resident on a direct neighbouring node violates the security policies, the DFC client 215 puts the policy violator node in quarantine.

Figure 9:
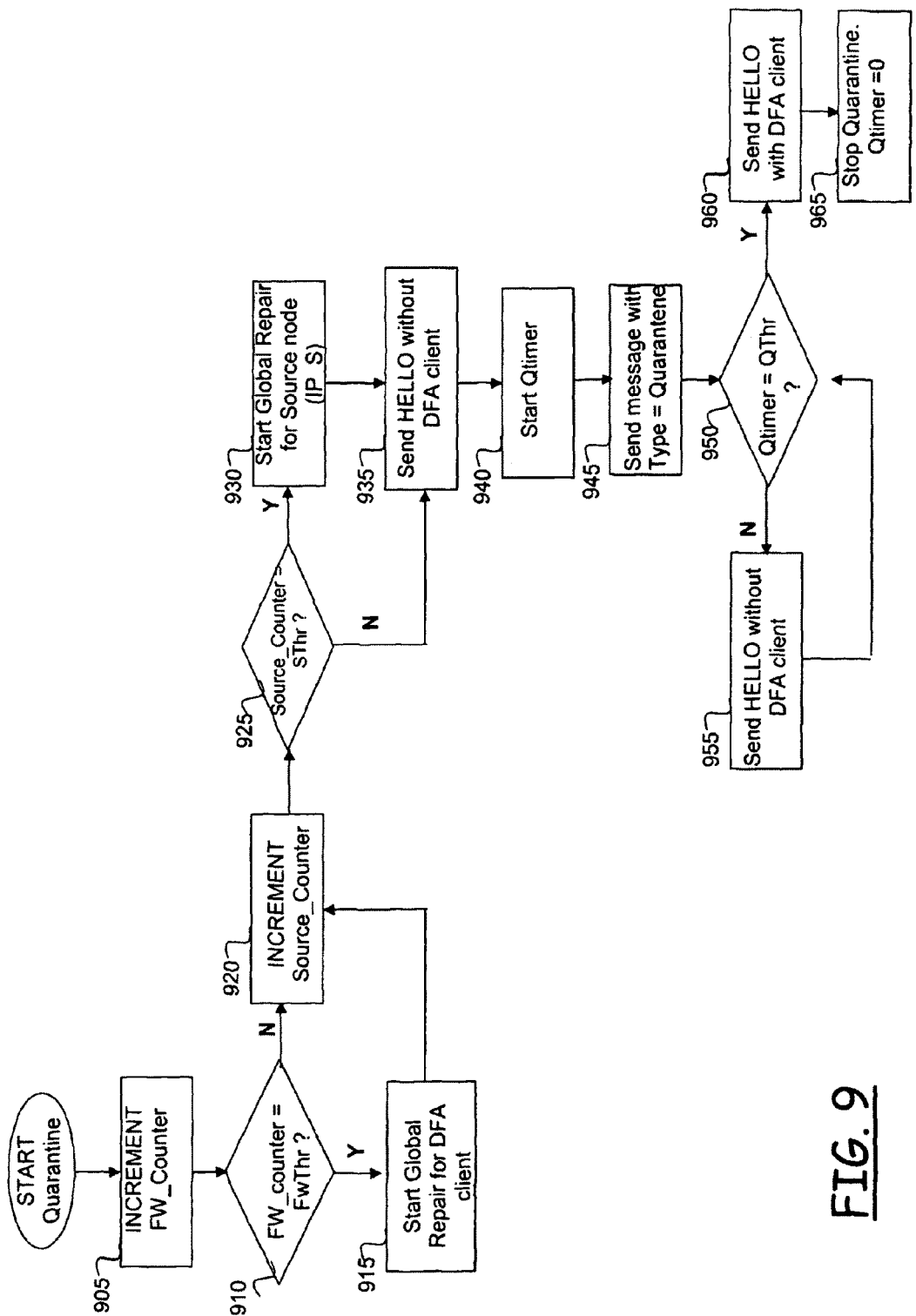
FIG. 9 is a schematic flowchart of a node quarantine mechanism according to an embodiment of the present invention.

The schematic flowchart of FIG. 9 depicts the quarantine procedure, in an embodiment of the present invention.

Firstly, the DFC client 215 increments a first counter (hereinafter referred to as "FW counter") that is used to keep track of the number of consecutive times that the considered DFA client 120, to be put in quarantine, has not properly enforced the security policies defined for the MANET (block 905).

The DFC client 215 then checks if the value of the FW counter for the considered DFA client 120 has reached a predetermined threshold FwThr (block 910): in the affirmative case (exit branch Y of block 910), the DFC client 215 starts the global repair procedure in respect of that DFA client 120 (block 915), as described in detail later on: in such a case, the DFC client 215 preferably broadcasts a QUARANTINE message with a flag set to indicate that the global repair procedure has been started for that DFA client 120, so as to avoid that different DFC clients 215 start the global repair procedure for the same DFA client 120.

Then, the DFC client 215 increments a second counter (hereinafter referred to as the "source counter"), that is used to keep track of the number of consecutive times that the source node (having IP address IP_S) originating the traffic that violates the security policies has attempted to generate unauthorized traffic (block 920). The DFC client 215 checks (block 925) if the value of the source counter has reached a predetermined threshold value SThr: in the affirmative case (exit branch Y of block 925), the DFC client 215 starts the global repair procedure (block 930) for the source node having IP address IP_S, and sets the respective flag to be included in a QUARANTINE message that is successively broadcast, so as to avoid that other DFC clients 215 start the global repair procedure in respect of that node.

The quarantine involves temporarily isolating the node hosting the DFA client 120 that did not enforce the security policies. The node hosting the DFC client 215 ceases announcing the violator node as its neighbour in HELLO messages it sends (block 935), and activates a third counter, hereinafter referred to as "Qtimer" (block 940). Then, the DFC client 215 broadcasts a QUARANTINE message (block 945), so that the other network nodes are made aware of the security policies violation, and remove from their routing tables the routes involving the violator node. Until the value of the timer Qtimer reaches the prescribed threshold value (exit branch N of block 950), the DFC client 215 continues to broadcast HELLO messages without announcing the violator node (955). When instead the value of the timer Qtimer reaches the preset threshold value (exit branch Y of block 950), the DFC client 215 re-inserts the node hosting the violator DFA client 120 into the HELLO messages it broadcasts (block 960), and resets the time Qtimer (block 965): the quarantine is thus stopped, and the DFA client 120 that violated the security policies is re-inserted in the routing tables of the MANET nodes.

Figure 10A:
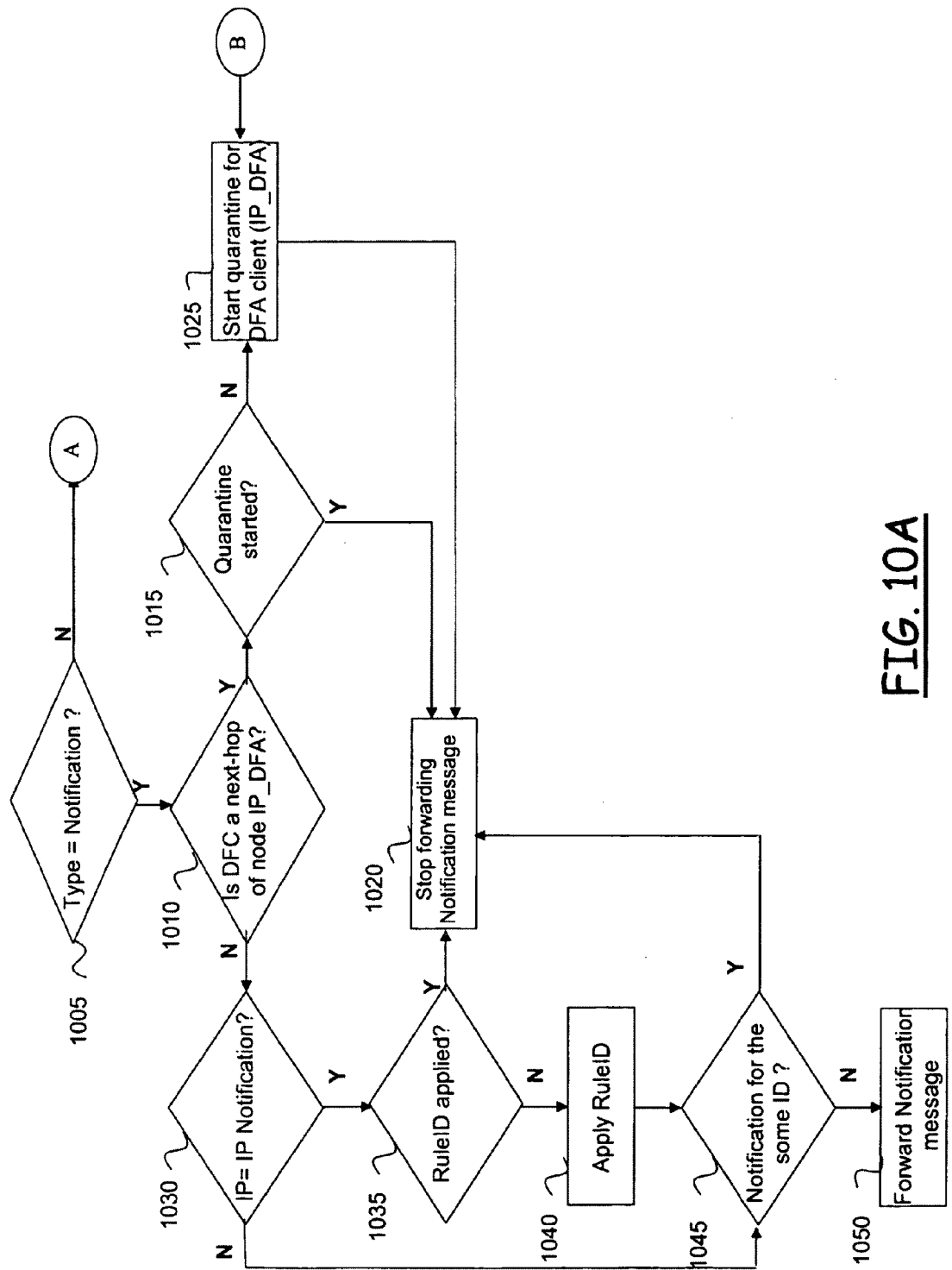
FIGS. 10A and 10B are schematic flowcharts of a process of management of alarm messages used in the DFC architecture, according to an embodiment of the present invention.
Figure 10B:
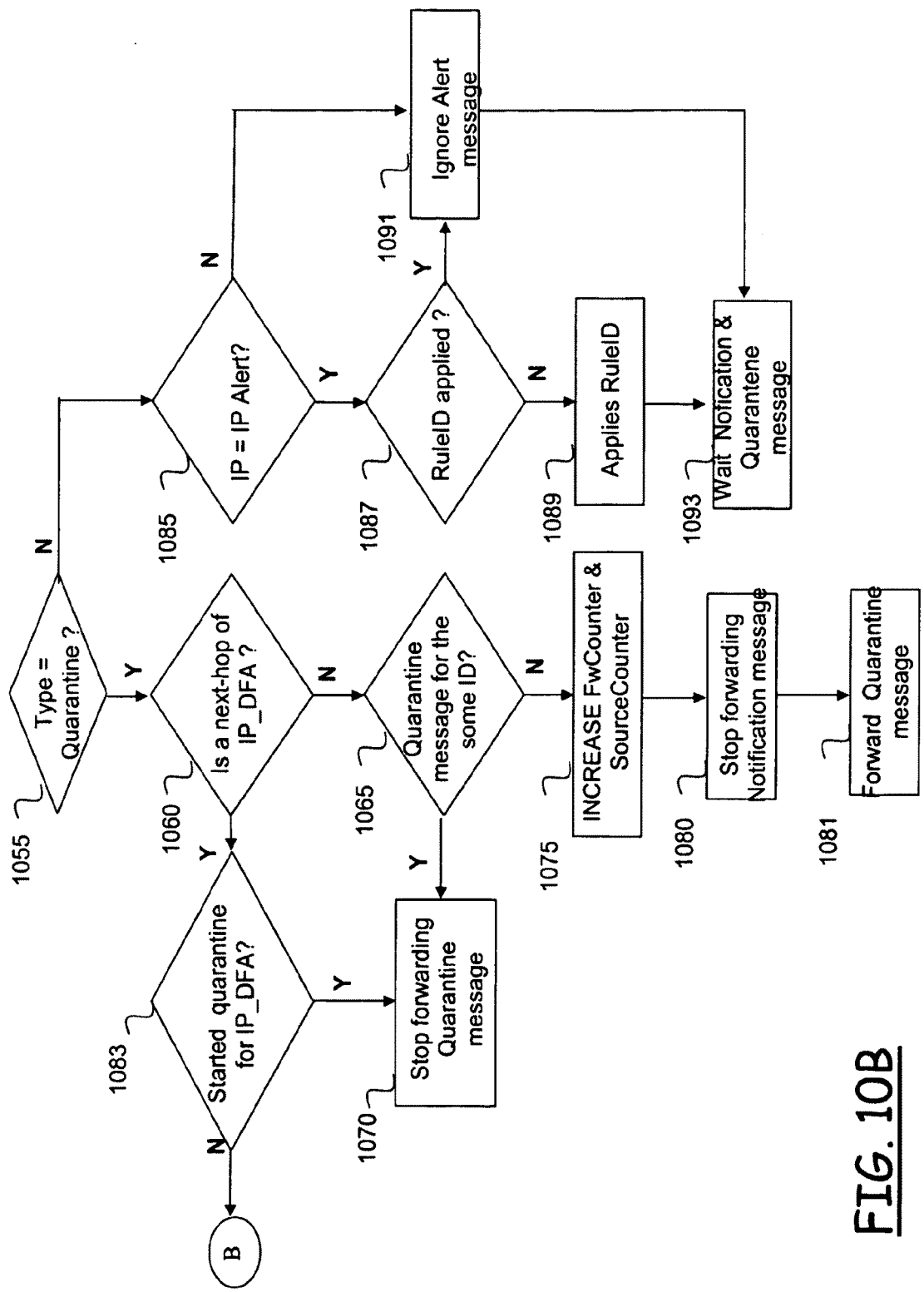

In the schematic flowchart of FIGS. 10A and 10B the management of the alarm messages that have been mentioned in the foregoing and that are used in an embodiment of the present invention is depicted.

As mentioned in the foregoing, the NOTIFICATION message is broadcasted to all the MANET nodes whenever a DFC client 215, during the monitoring of the traffic on the controlled DFA client 120, detects a violation of the security policies defined for the MANET, and identifies the violator DFA client 120 that has not enforced the security policies, but the DFC client 215 cannot directly put the violator node in quarantine, because the violator node is not a next-hop thereof.

The purpose of the NOTIFICATION message is:
notifying to the other MANET nodes that a certain DFA client 120 has not properly enforced the security policies;
ask the neighbouring nodes to put the violator node in quarantine; and
ask the nodes that are along the route from the source node to the destination node to temporarily apply the violated security policies.

The structure of the NOTIFICATION message is depicted in FIG. 11; the message includes:
a field 1105 for carrying the IP address IP_S of the source node originating the data packets violating the security policies;
a field 1110 for carrying the IP address IP_D of the destination node of the data traffic;
a field 1115 for carrying the IP address IP_DFA of the node where the DFA client 120 that has not enforced the security policies resides;
a field 1120 for carrying an identifier ID of the traffic session;
a field 1125 for carrying an identifier RuleID of the security policy (firewalling rule) that has been violated; and
a field 1130 for carrying the IP address IPNotification of the node where the DFA client 120 resides that is controlled by the DFC client 215 and that has detected traffic not compliant with the security policy identified by the identifier RuleID.

Referring to FIG. 10A, each DFC client 215, upon receiving an alarm message, checks (block 1005) if the received message is a message of the type NOTIFICATION. In the affirmative case (exit branch Y of block 1005), the DFC client 215 checks if the node where it resides is a direct neighbour of the node where the violator DFA client 120 resides (the node whose IP address IP_DFA is contained in the field 1115) (block 1010): in the affirmative case (exit branch Y of block 1010), the DFC client 215 checks whether it has already put the violator node in quarantine (block 1015). If the violator node has already been put in quarantine (exit branch Y of block 1015), the DFC client 215 stops propagating the NOTIFICATION message (block 1020). If on the contrary the violator node has not been put in quarantine yet (exit branch N of block 1015), the DFC client 215 starts the quarantine procedure in respect of the violator node (block 1025) and then it stops propagating the NOTIFICATION message (block 1020).

If the node where the DFC client 215 that received the NOTIFICATION message is not a direct neighbour of the violator node (exit branch N of block 1010), then the DFC client 215 checks whether the node where it resides is on the route from the source node (IP address IP_S) to the destination node (IP address IP_D), by assessing if the IP address of the node where it resides coincides with the address IPNotification contained in the field 1130 of the received message (block 1030). In the affirmative case (exit branch Y of block 1030), the DFC client 215 assesses whether it has already applied the security policy (firewalling rule) that has been violated (identified by the identifier RuleID contained in the field 1125 of the received message) (block 1035). If it has (exit branch Y of block 1035), then it means that the DFC client 215 has already received previous NOTIFICATION alarm messages, possibly by other DFC clients 215 that control it, and thus it stops further propagating the NOTIFICATION message (block 1020). Differently (exit branch N of block 1035), it applies the violated security policy (identified by the identifier Rule ID) (block 1040), and stops routing further data packets of the type identified by the identifier ID contained in the field 1120 of the received message. The DFC client 215 then checks (block 1045) if it already received previous NOTIFICATION messages in respect of the same traffic session identifier by the identifier ID: in the negative case (exit branch N of block 1045), it propagates further the message (block 1050), otherwise (exit branch Y of block 1045) it stops propagating the message (block 1020).

If the DFC client 215 assesses that the node where it resides is not on the route from the source node to the destination node (exit branch N of block 1030), then it checks whether it already received previous NOTIFICATION messages for the same traffic session (block 1045); in the affirmative case (exit branch Y of block 1045), it stops propagating the message (block 1020), otherwise (exit branch N of block 1045), it further propagates the message (block 1050).

The QUARANTINE message is broadcasted to all the MANET each time a DFC client 215 detects that a controlled DFA client 120 has not enforced the security policies, and, being the node where it resides a next-hop of the node where the violator DFA client 120 resides, it directly puts the latter in quarantine. The QUARANTINE message is also broadcasted by a DFC client 215 that, having received a NOTIFICATION message, recognizes to be a direct neighbour of the violator DFA client 120, and thus puts the latter in quarantine.

The purpose of the QUARANTINE message is that of informing the other nodes that a certain node has been put in quarantine, and thus it allows keeping the counters FW counter and source counter aligned.

The structure of the QUARANTINE message is depicted in FIG. 12; the message includes:
- a field 1205 for carrying the IP address IP_S of the source node originating the data packets violating the security policies;
- a field 1210 for carrying the IP address IP_D of the destination node of the data traffic;
- a field 1215 for carrying the IP address IP_DFA of the node where the DFA client 120 that has not enforced the security policies resides;
- a field 1220 for carrying an identifier ID of the traffic session;
- a field 1225 for carrying an identifier RuleID of the security policy (firewalling rule) that has been violated;
- a field 1230 for carrying a flag CGR ("Client Global Repair") used to notify to the other nodes that a global repair procedure has been started for the violator DFA client 120 residing on the node of address IP_DFA; and
- a field 1235 for carrying a flag SGR ("Source Global Repair") used to notify to the other nodes that the global repair procedure has been started for the source node of address IP_S that generated the unauthorized traffic.

Referring to FIG. 10B, the DFC client 215, upon verifying that received alarm message is not a NOTIFICATION message (exit branch N of block 1005), checks whether the message is a QUARANTINE message (block 1055). In the affirmative case (exit branch Y of block 1055) it checks whether the node where it resides is a direct neighbour of the node where the violator DFA client 120 resides, identified by the address IP_DFA contained in the field 1215 of the received message (block 1060): if this is not the case (exit branch N of block 1060), the DFC client 215 checks whether it already received previous QUARANTINE messages for the same session identified by the session identifier ID contained in the field 1220 of the received message (block 1065), in which case (exit branch Y of block 1065) it stops propagating the QUARANTINE message (block 1070); if no QUARANTINE messages were previously received (exit branch N of block 1065), the DFC client 215 increases the counters FW counter and source counter (block 1075), stops forwarding the NOTIFICATION messages (block 1080) received/generated in respect of the same session identified by the identifier ID, and propagates the QUARANTINE message to the other nodes (block 1081).

If the DFC client 215 instead realizes to be a direct neighbour of the node where the violator DFA client 120 resides (exit branch Y of block 1060), it checks whether the violator node has already been put in quarantine (block 1083): if it has not (exit branch N of block 1083), the DFC client 215 puts the violator node in quarantine (connector B and block 1025), otherwise (exit branch Y of block 1083) it stops propagating the QUARANTINE message (block 1070).

ALERT alarm messages, differently from the NOTIFICATION and QUARANTINE messages, are sent only to the next hops of the node hosting a DFC client 215 each time the latter is more than 3 hops far from the source node of the unauthorized traffic, and only in case the DFC client 215 is not able to identify which is the DFA client 120 that has not enforced the security policies. The ALERT message is sent to inform a DFA client 120 controlled by the DFC client 215 about the presence of unauthorized traffic along the route from the source node to the destination node, so that the DFA client 120 can block the unauthorized traffic.

The structure of the ALERT message is depicted in FIG. 13; the message includes:
- a field 1305 for carrying the IP address IP_S of the source node originating the data packets violating the security policies;
- a field 1310 for carrying the IP address IP_D of the destination node of the data traffic;
- a field 1315 for carrying the IP address IP_DFA of the node where the DFA client 120 that has not enforced the security policies resides;
- a field 1320 for carrying an identifier ID of the traffic session;
- a field 1325 for carrying an identifier RuleID of the security policy (firewalling rule) that has been violated;
- a field 1330 for carrying the IP address IP_Alert of the node hosting the DFA client 120 controlled by the DFC client 215 and that detected the presence of unauthorized traffic.

Upon receiving an ALERT message (exit branch N of block 1055), the DFC client 215 checks whether it is on the route from the source node to the destination node, by comparing its own IP address with the address IP_Alert contained in the field 1330 of the received message (block 1085). If the two addresses coincide (exit branch Y of block 1085), then the DFC client 215 ascertains whether it has already applied the violated security policies (identified by the identifier RuleID) (block 1087). If not (exit branch N of block 1087), the security policy is applied (block 1089), otherwise it means that previous ALERT messages were already received for the same session, and the message is thus ignored (block 1091). In both cases, the DFC client 215 waits for the next NOTIFICATION and QUARANTINE messages (block 1093). A DFC client 215 that, upon receiving the ALERT message, assesses not to be along the route from source node to the destination node (exit branch N of block 1085) ignores the ALERT message (block 1091) and keeps on listening next NOTIFICATION and QUARANTINE messages (block 1093).

Global Repair Mechanism

The global repair mechanism involves the intervention of the DFC server 205, which is responsible of centrally managing the DFC mechanism, each time a stronger countermeasure against the security policies violator nodes is requested, in respect of nodes that have repeatedly violated the security policies, not enforcing them properly. The global repair mechanism is used whenever the quarantine did not succeed.

The global repair mechanism may involve the exclusion from the MANET of a node where the violator DFA client 120 resides, identified during the local repair procedure; the node excluded from the MANET may be requested to re-authenticate itself in order to be re-admitted to the MANET.

The global repair procedure in respect of a generic network node is started by the first DFC client 215 whose counter FW counter for that node reaches the predetermined threshold: in such a case, the DFC client 215, during the local repair procedure, sets the CGR flag in the QUARANTINE message it broadcasts. The DFC clients 215 that receive the QUARANTINE message with the CGR flag set are informed of the fact that some node already started the global repair procedure, and thus they reset the respective counters FW counter in respect of the same DFA client 120.

The global repair procedure involves the transmission to the DFC server 205 of a GLOBAL REPAIR REQUEST message, whose structure is pictorially shown in FIG. 14A. The message, globally denoted 1400, includes:
- a field 1405 for carrying the IP address IP_S of the source node of the data packets that violate a certain security policy;
- a field 1410 for carrying the IP address IP_DFA of the node where the violator DFA client 120 resides, that has not enforced the security policy; and
- a field 1415 for carrying the identifier RuleID of the violated security policy (firewalling rule).

Upon receiving a GLOBAL REPAIR REQUEST message, the DFC server 205 verifies whether a violation actually occurred. This is done by an interaction with the DFA server 110. The latter:
- checks the correspondence between the security policy identified by the identifier RuleID contained in the received GLOBAL REPAIR REQUEST message, and one of the security policies in a list of security policies configured for the MANET;
- ensures that the security policy identified by the identifier RuleID has actually been sent to the source node of the unauthorized traffic and the node where the violator DFA client 120 resides, specified in the received GLOBAL REPAIR REQUEST message (the DFA server 110 keeps a list of the active MANET nodes, and, for each of them, an indication of the current security policies (general and specific) applied by the node).

If the DFA server 110 finds that the DFA client 120 identified by the IP address IP_DFA in the received GLOBAL REPAIR REQUEST message actually violated the security policies, the DFA server 110 removes the IP address IP_DFA of that node (and thus the firewalling rule defined for it) from its database. Then, the DFA server 110 sends to the authentication server of the MANET the identifier IP_DFA of the node to be de-authenticated. The DFA server 110 also sends to the DFC server 205 a GLOBAL REPAIR ACCEPT message, by means of which it requests the exclusion of the node identified by the IP address IP_DFA from the MANET. The structure of the GLOBAL REPAIR ACCEPT message is schematically depicted in FIG. 14B: the message, globally denoted 1450, contains a field 1455 for carrying the IP address IP_DFA of the node to be excluded from the list of DFC clients 215, and a field 1460 for carrying a signature of the DFC server 205. The signature is included in the GLOBAL REPAIR ACCEPT message by the DFC server 205, which sends it to the node that sent the GLOBAL REPAIR REQUEST message; the GLOBAL REPAIR ACCEPT message is then broadcasted in the MANET, so that the nodes can exclude the node identified by the IP address IP_DFA, blocking any kind of traffic it generated, exception made for authentication traffic for the re-authentication of the node in the MANET. At the same time, the DFA server 205 informs every node of the exclusion of the DFA client 120 resident on the excluded node; this is done through the periodic polling mechanism by which the DFA clients 120 get from the DFA server 110 the security policies to be enforced.

The same global repair procedure is also applied when the counter source counter reaches the predetermined threshold.

In addition to the detection of the improper enforcement of the security policies, the present invention can also be used for detecting and contrasting selfish nodes, which tend to participate to the MANET in such a way that they only route their own data packets, discarding the data packets originating from/directed to other nodes. Exploiting the same mechanisms described in the foregoing (selection of the controlled DFA clients 120 and of the controller DFC clients 215, local and global repair mechanisms), it is possible to isolate the selfish nodes, thereby promoting cooperation between the nodes.

Referring to FIG. 2, each node acts as a controller (DFC client 215) of a certain DFA client 120, through the constant monitoring of the traffic entering and exiting the controlled DFA client 120. In order to detect and manage a selfish behaviour of a controlled DFA client 120, the controller DFC client 215 checks that the packets related to the routing protocol and the application-layer packets are properly routed (complying the security policies defined for the MANET).

Figure 15:
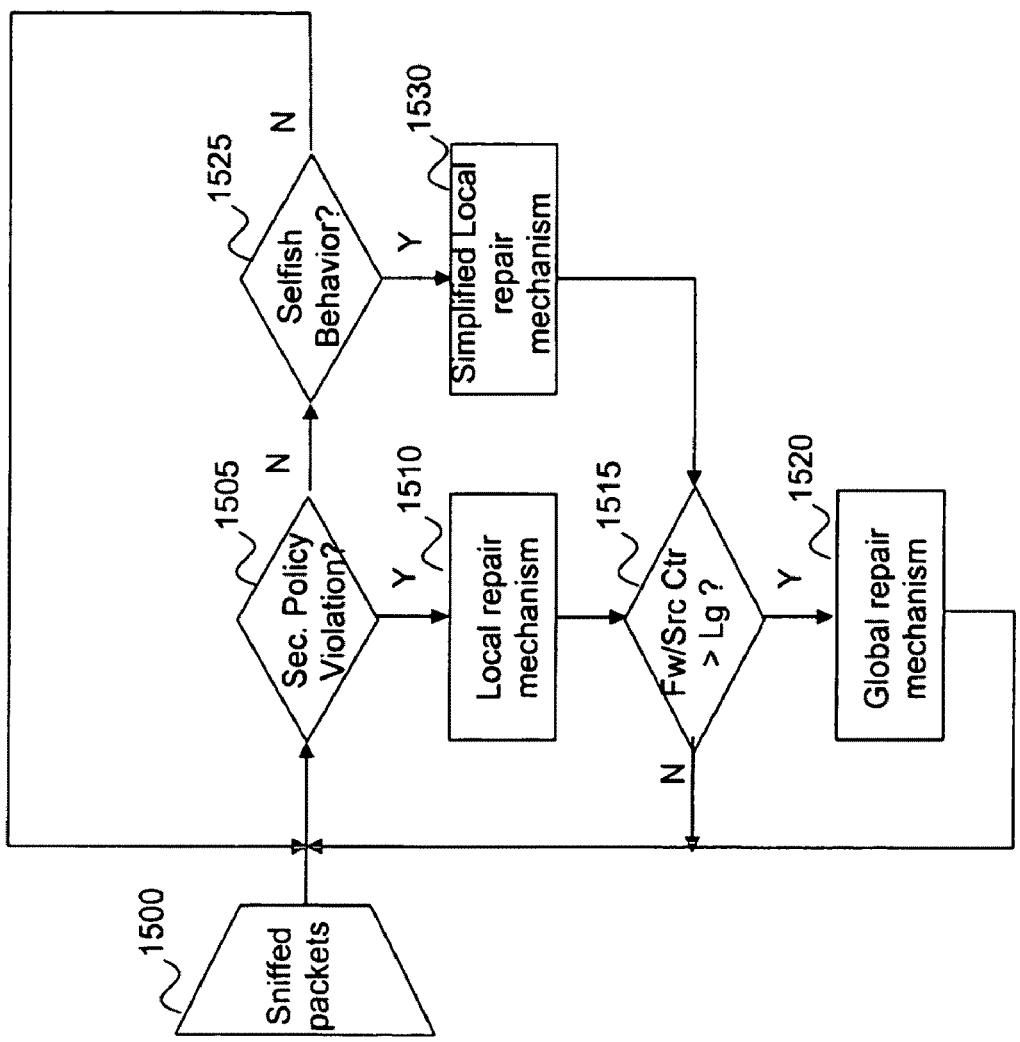
FIG. 15 describes an architecture of a selfish node detection mechanism according to an embodiment of the present invention.

In particular, referring to FIG. 15, for each data packet 1500 entering and/or exiting a controlled DFA client 120, it is first assessed whether the packet complies with the security policies defined for the MANET (block 1505); in case of violation of the security policies (exit branch Y of block 1505), this is managed as described in the foregoing, first through the local repair mechanism (block 1510), and then through the global repair mechanism (block 1520), if the counters FW counter and/or source counter have reached the predetermined threshold (block 1515). If the packet complies with the security policies defined for the MANET (exit branch N of block 1505), the selfish node detection logic is applied (block 1525): for each packet entering the controlled DFA client 120, having destination IP address IP_D different from the IP address IP_DFA of the node where the controlled DFA client 120 resides, the presence of a corresponding packet exiting the node is checked by the controller DFC client 215. In case the entering packets are discarded (not let pass through), the controller DFC client 215 decrees a selfish behaviour (exit branch Y of block 1525), and applies a simplified local repair mechanism (1530): the controller DFC client 215 increases a dropped packets counter associated with the controlled DFA client 120; if the dropped packets counter reaches a selfish node detection threshold (set by the controller DFC client 215 according to the security policies of the MANET), then the controller DFC client 215 broadcasts a SELFISH NODE QUARANTINE message, schematized in FIG. 16 and including:
- a field 1605 carrying an IP address IP_SELF of the selfish node;
- a field 1610 carrying the MAC address of the selfish node;
- a field 1615 carrying the identifier RuleID of the violated firewalling rule; and
- a field 1620 carrying a flag indicating whether the global repair procedure has already been started.

Each DFC client 215 which, upon receiving the SELFISH NODE QUARANTINE message, realizes to be a direct neighbour of the selfish node, puts the latter in quarantine, stopping to announce the selfish node as its neighbour in the HELLO messages, and ignores routing messages coming from the selfish node. In this way, the distant DFC clients, not receiving information about the selfish node, remove it from their routing tables. Similarly to the case of violation of a security policies described above, the quarantine is temporary, and lasts a predetermined time (for example, a timer is used for this purpose), after which the nodes that are direct neighbours of the selfish node restart announcing the selfish node as their neighbour; the selfish node is thus re-inserted in the routing tables of all the nodes of the MANET.

The SELFISH NODE QUARANTINE message is also exploited to keep the counters FW counter of the controller DFC clients aligned; these counters are used, as described above, for handling the global repair procedure (a same counter is used for starting the global repair procedure, irrespective of whether a violation of a security policy or a selfish behaviour are detected).

The invention has been here described making reference to an exemplary embodiment thereof; those skilled in the art will recognize that several modifications to the described embodiment, as well as other embodiments are conceivable, without departing from the scope of the invention, defined in the appended claims.

The invention claimed is:

1. A method of enforcing security policies in a mobile ad-hoc network, comprising:
    entrusting at least one first network node, along a data traffic route from a data traffic origin node to a data traffic destination node, with enforcing of predefined security policies on said data traffic;
    entrusting at least one second network node, distinct from said first network node, with control of the enforcement of the security policies by said first network node; and
    having the at least one second network node control compliance with the predefined security policies of data traffic passing through at least one third network node along said data traffic route.

2. The method of claim 1, wherein said at least one first network node comprises a network node being a direct neighbour of the origin node.

3. The method of claim 2, wherein said at least one first network node further comprises a network node being a direct neighbour of the destination node.

4. The method of claim 1, further comprising:
    providing at least one central security policies distribution server capable of being configured to distribute the predefined security policies to the network nodes.

5. The method of claim 1, further comprising:
    having the at least one second network node selecting said at least one third network node among a set of multipoint relay nodes thereof.

6. The method of claim 5, wherein having the at least one second network node selecting the at least one third network node comprises selecting the at least one third network node among two or more respective multipoint relay nodes as either:
    the multipoint relay node through which a lowest number of nodes distant two hops can be reached; or
    in case two or more of the multipoint relay nodes of the second network nodes allow reaching a same lowest number of nodes distant two hops, the multipoint relay node that has in turn elected a lowest number of multipoint relay nodes.

7. The method of claim 6, wherein having the at least one second network node selecting the at least one third network node further comprises:
    in case two or more of the multipoint relay nodes of the second network nodes have elected a same lowest number of multipoint relay nodes, choosing the at least one third network node at random among said two or more of the multipoint relay nodes of the second network node that have elected the lowest number of multipoint relay nodes.

8. The method of claim 1, wherein, in case the at least one second network node is in a loop, selecting the at least one third network node comprises selecting, among the multipoint relay nodes of the second network node, the network node that, starting from the second network node and passing through a node in the loop having lowest network address, allows reaching a first node announced in a multipoint relay selector set in a transmission control protocol message.

9. The method of claim 1, further comprising:
    in case the second network node detects a security policies violation:
    having the second network node ascertain whether the third network node is the first network node;

if the third network node is the first network node, having the second network node undertake an action directed to at least temporarily exclude the first network node from the network;

if the third network node is not the first network node, having the second network node:
  identify the first network node, and
  in case said first network node is a direct neighbour of the second network node, undertake an action directed to at least temporarily exclude the first network node from the network;
  in case said first network node is not a direct neighbour of the second network node, or the first network node cannot be identified, broadcast an alarm message capable of being adapted to inform the other network nodes of the security policies violation.

10. The method according to claim 1, further comprising:
having the second network node controlling whether the third network node properly routes data traffic entering thereinto; and
in the negative case, having the second network node undertake an action to temporarily exclude the third network node from the network.

11. The method of claim 10, wherein controlling whether the third network node properly routes data traffic entering thereinto comprises:
having the second network node ascertain that, for each data packet entering the third network node and destined to a destination network node different from the third node, there is a corresponding data packet exiting the third node.

12. A system for enforcing security policies in a mobile ad-hoc network, comprising:
at least one first network node, along a data traffic route from a data traffic origin node to a data traffic destination node, entrusted with enforcing of predefined security policies on data traffic; and
at least one second network node, distinct from said first network node, entrusted with control of enforcement of security policies by said first network node,
  wherein the at least one second network node is configured to control compliance with the predefined security policies of the data traffic passing through at least one third network node along said data traffic route.

13. The system of claim 12, wherein said at least one first network node comprises a network node being a direct neighbour of the origin node.

14. The system of claim 13, wherein said at least one first network node further comprises a network node being a direct neighbour of the destination node.

15. The system of claim 12, further comprising at least one central security policies distribution server capable of being configured to distribute the predefined security policies to the network nodes.

16. The system of claim 12, wherein:
the at least one second network node is capable of being adapted to select the at least one third network node among a set of a multipoint relay nodes thereof.

17. The system of claim 16, wherein said at least one second network node is capable of being adapted to select the at least one third network node among two or more respective multipoint relay nodes as either:
  the multipoint relay node through which a lowest number of nodes distant two hops can be reached; or
  in case two or more of the multipoint relay nodes of the second network nodes allow reaching a same lowest number of nodes distant two hops, the multipoint relay node that has in turn elected a lowest number of multipoint relay nodes.

18. The system of claim 17, wherein said at least one second network node is capable of being adapted to select the at least one third network node randomly among two or more of the multipoint relay nodes of the second network node that have elected the lowest number of multipoint relay nodes.

19. The system of claim 16, wherein, in case the at least one second network node is in a loop, the second network node is capable of being adapted to select, among the multipoint relay nodes of the second network node, the network node that, starting from the second network node and passing through a node in the loop having lowest network address, allows reaching a first announced node announced in a multipoint relay selector set in a transmission control protocol message.

20. The system of claim 12, wherein:
in case the second network node detects a security policies violation, the second network node is capable of being adapted to assess whether the third network node is the first network node, and:
in the affirmative case, to undertake an action directed to at least temporarily exclude the first network node from the network;
in the negative case:
to identify the first network node;
in case said first network node is a direct neighbour of the second network node, undertake an action directed to at least temporarily exclude the first network node from the network; and
in case said first network node is not a direct neighbour of the second network node, or the first network node cannot be identified, to broadcast an alarm message capable of being adapted to inform the other network nodes of the security policies violation.

21. The system according to claim 12, wherein the second network node is further capable of being adapted to control whether the third network node properly routes data traffic entering thereinto, and, in the negative case, to undertake an action to temporarily exclude the third network node from the network.

22. The system of claim 21, wherein the second network node is capable of being adapted to ascertain that, for each data packet entering the third network node and destined to a destination network node different from the third node, there is a corresponding data packet exiting the third node.

* * * * *